(12) United States Patent
Kobashi et al.

(10) Patent No.: US 7,555,710 B2
(45) Date of Patent: Jun. 30, 2009

(54) METHOD, APPARATUS AND PROGRAM FOR DETERMINING LAYOUT OF A PAGE USING LINKS BETWEEN PARTIAL AREAS IN THE PAGE

(75) Inventors: Kazufumi Kobashi, Yokohama (JP); Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 11/212,708

(22) Filed: Aug. 29, 2005

(65) Prior Publication Data

US 2006/0044615 A1 Mar. 2, 2006

(30) Foreign Application Priority Data

Aug. 31, 2004 (JP) ............................. 2004-252901

(51) Int. Cl.
*G06F 17/00* (2006.01)
(52) U.S. Cl. .................. 715/243; 715/244; 715/246
(58) Field of Classification Search ......... 715/243–247, 715/252
See application file for complete search history.

(56) References Cited

U.S. PATENT DOCUMENTS

| | | | |
|---|---|---|---|
| 5,701,500 A * | 12/1997 | Ikeo et al. .................. 715/209 |
| 5,845,303 A | 12/1998 | Templeman |
| 5,943,679 A * | 8/1999 | Niles et al. .................. 715/247 |
| 6,169,544 B1 | 1/2001 | Onoda |
| 6,826,727 B1 * | 11/2004 | Mohr et al. .................. 715/235 |
| 7,028,255 B1 | 4/2006 | Ayers |
| 7,051,276 B1 * | 5/2006 | Mogilevsky et al. ........ 715/209 |
| 7,133,050 B2 * | 11/2006 | Schowtka .................... 345/620 |
| 2002/0040375 A1 * | 4/2002 | Simon et al. ................ 707/517 |
| 2002/0051208 A1 | 5/2002 | Venable |
| 2004/0225961 A1 * | 11/2004 | Ohashi et al. ............... 715/517 |
| 2005/0071743 A1 * | 3/2005 | Harrington et al. ......... 715/500 |
| 2005/0172226 A1 | 8/2005 | Kobashi et al. |
| 2006/0028659 A1 | 2/2006 | Nishikawa |
| 2006/0050287 A1 | 3/2006 | Kobashi et al. |
| 2008/0098326 A1 * | 4/2008 | Kanzaki ..................... 715/783 |

FOREIGN PATENT DOCUMENTS

| | | |
|---|---|---|
| JP | 6168310 | 6/1994 |
| JP | 7-129658 | 5/1995 |
| JP | 2004-15215 | 1/2004 |

\* cited by examiner

*Primary Examiner*—Thu Huynh
(74) *Attorney, Agent, or Firm*—Fitzpatrick, Cella, Harper & Scinto

(57) ABSTRACT

The present invention provides a layout adjustment method and an apparatus and a program for the same for allowing a size and a layout of a sub-template to be preferably set and an intention of a user who performs the layout to be better reflected according to the size of contents to be affixed in the sub-template in variable data print. The plurality of partial areas, to which data is to be inserted, are linked and work together to calculate their appropriate sizes on the basis of the size of the data to be inserted. Then, a layout representing sizes and locations of the plurality of partial areas in a page is adjusted on the basis of relationship between a size of each calculated partial area and links set for the plurality of partial areas in the basic layout. Each of the partial areas further includes a plurality of smaller areas, which are linked so that the plurality of smaller areas work together to make their sizes variable to make sizes of said partial areas variable.

12 Claims, 34 Drawing Sheets

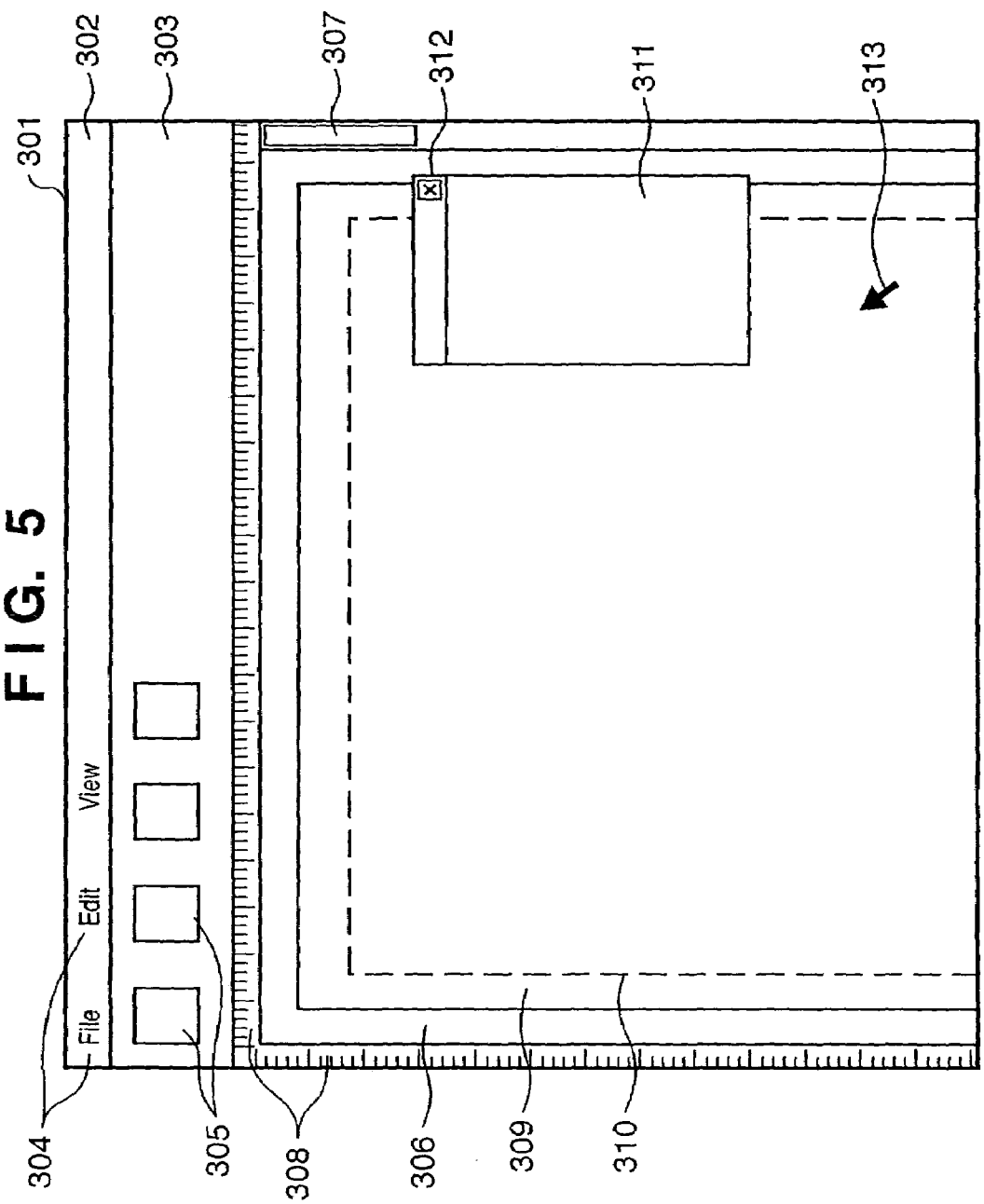

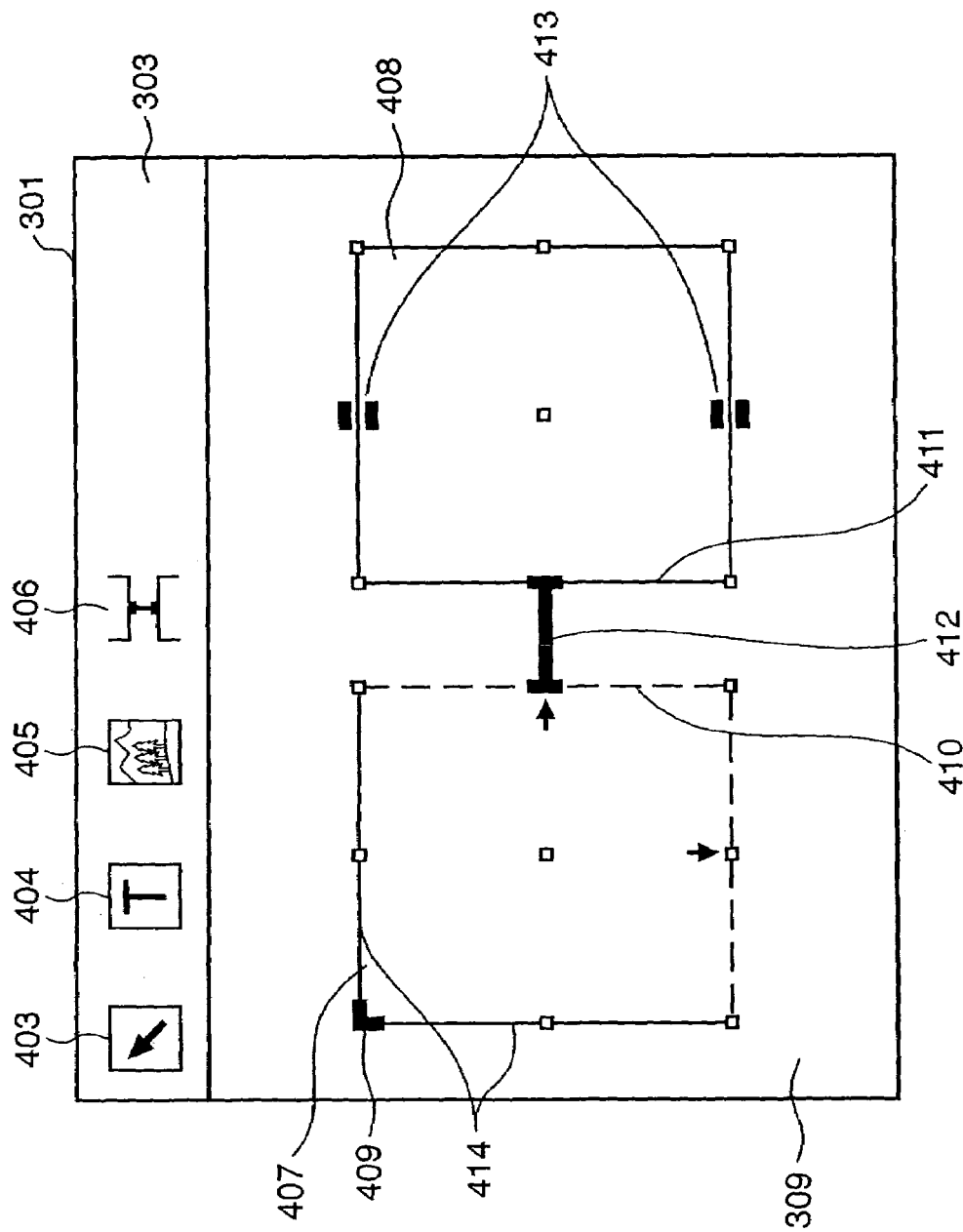

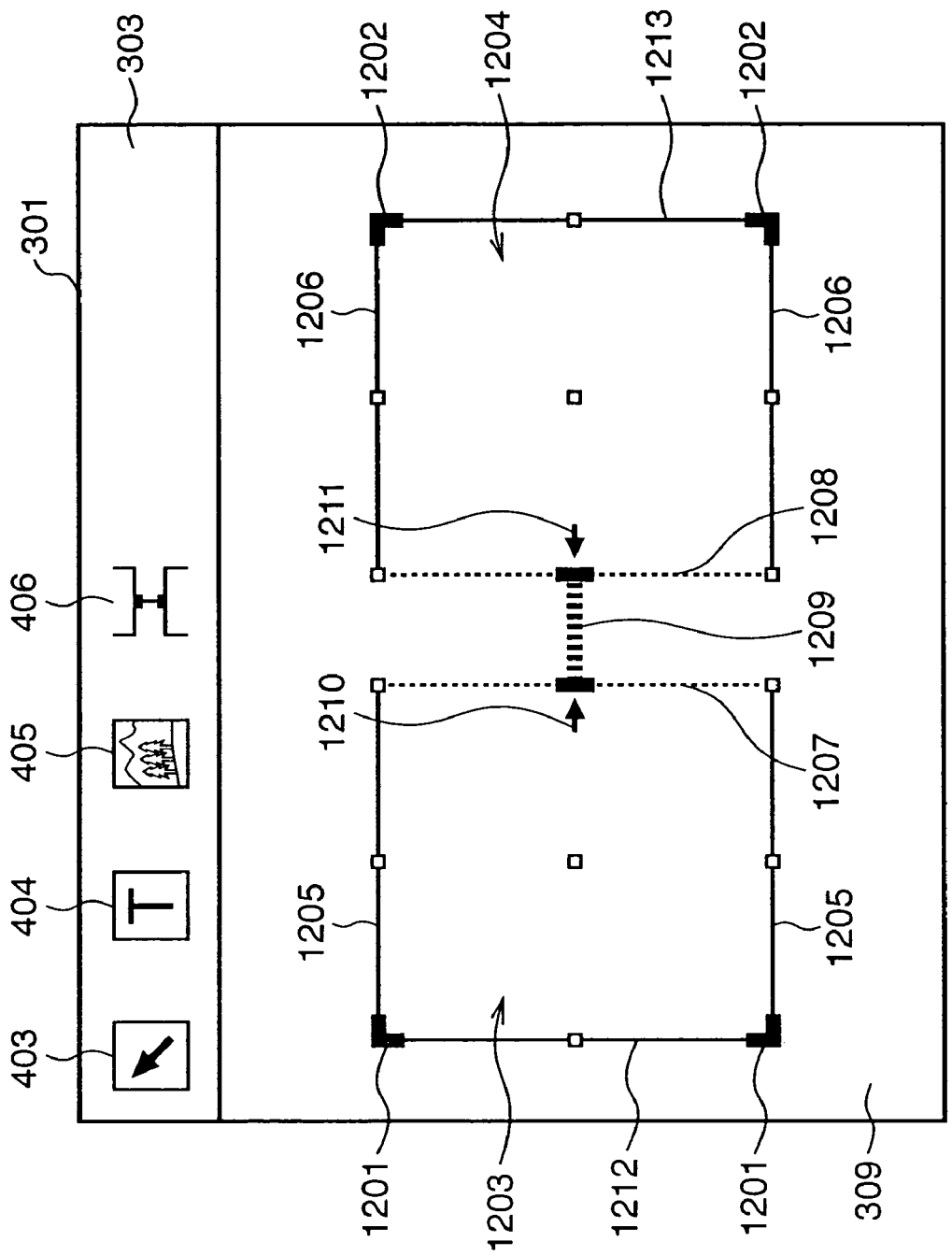

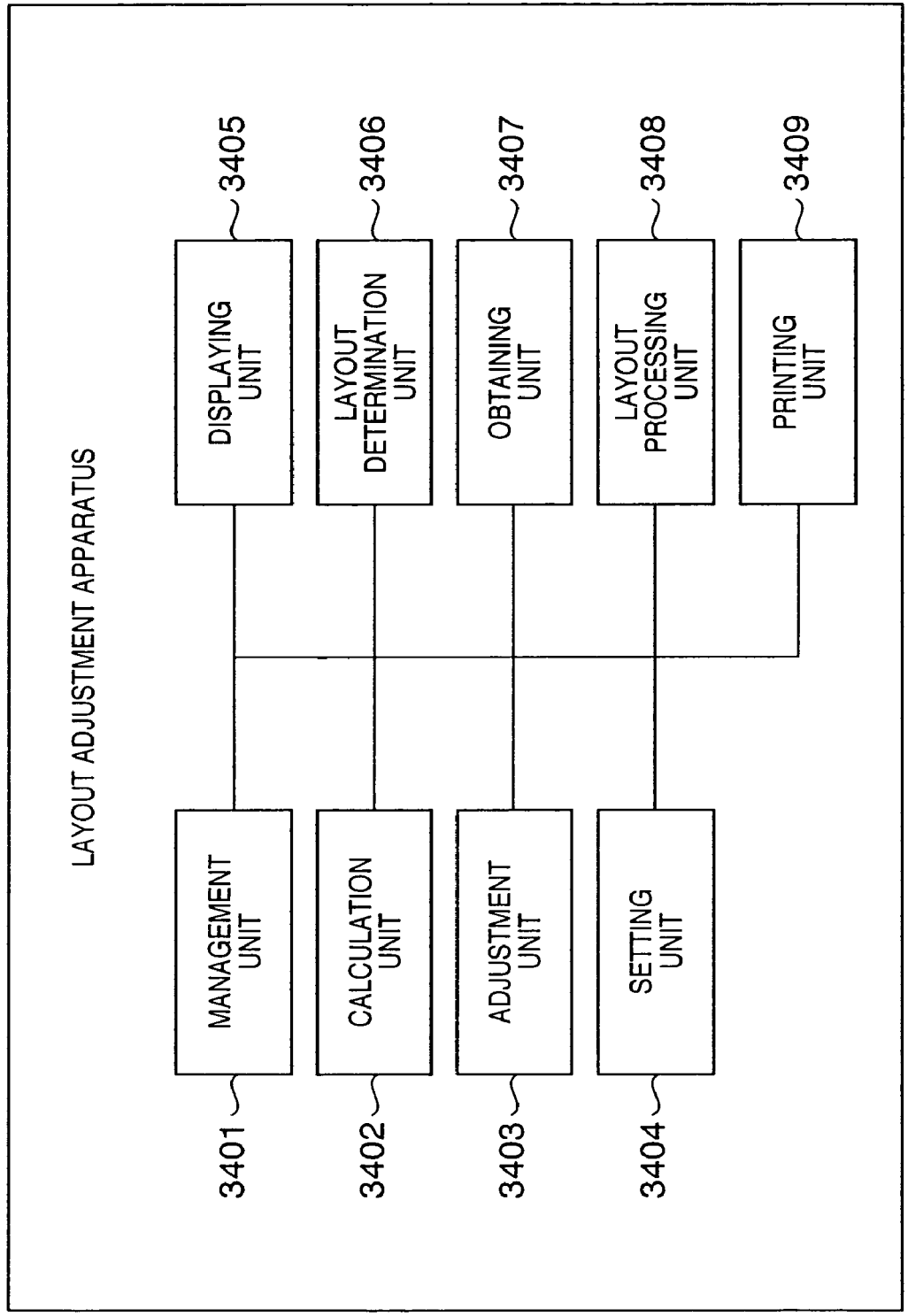

METHOD, APPARATUS AND PROGRAM FOR DETERMINING LAYOUT OF A PAGE USING LINKS BETWEEN PARTIAL AREAS IN THE PAGE

FIELD OF THE INVENTION

The present invention relates to a layout adjustment method, an apparatus and a program for the same for adjusting a layout of a variable data document including a text and an image in order to print the variable data document.

BACKGROUND OF THE INVENTION

As various types of products are developed for an item, life cycles of products are getting shorter. As the Internet is prevailed, customers become preferred to receive customized service. Due to these factors, CRM (Customer Relationship Management) and One-to-One marketing is getting required. These techniques are very effective in improving customer satisfaction and in cultivating the market and enclosing the customers.

The one-to-one marketing is a kind of database marketing. It makes a database of personal attribute information including customer's age, sex, interest, preference, and purchase history; analyses the contents of the database; and proposes a service or goods to the customers according to what the customers need. A typical example of the specific techniques is a variable print. As DTP (desk top publishing) technique has advanced and digital printing devices have prevailed, a variable print system for outputting a document customized for each customer has been developed. For such a variable print system, it is required to create a customized document with appropriately laying out the contents varying for each customer.

Generally, in the variable print system, a container is laid out on a document to create such a customized document. A container is a partial area for drawing contents (drawn contents) and often called a field area. That is to say, a customized document (document) is created through operations of laying out such a container on a document and associating the layout with database (associating each of the contents in database with each container). Such a document will be called a variable data document (sometimes simply called template) hereinafter.

In the variable print system, each laid out container is able to receive contents varying for each customer. The amount of data to be inserted in the container is variable. The amount of data indicates the size of image data or the character length of text data. When the container size is fixed, problems below will occur. For example, when text data with a size larger than that of the container is inserted, all of the text cannot be displayed in the container. Or, when image data with a size larger than that of the container is inserted, a part of the image is lost. This kind of problem is called overflow.

For example, when the contents are image data, the image can be scaled-down to be drawn in the container, with a probability of extremely little image being displayed. Or, when text data, too large for the fixed sized container, is tried inserted in the container, the font size of the text can be reduced to allow for the entire text to be displayed in the container. When the font size is adjusted, however, a problem occurs in that the font size becomes too little that the entire document becomes imbalanced or unreadable.

On the other hand, in a document edit application, a technique is developed for solving the abovementioned problems by setting the container size for a text or an image flexible. In this technique, the container size for a text or an image can be set flexible. The document edit application can be adapted to make the container size flexible so that the container size can be scaled up according to the amount of data to be entered by the keyboard. Another technique is also developed for displaying the entire text in the container by reducing the font size of the text, when the text data larger than the fixed sized container is inserted.

A problem occurs in that a container of a flexible size overlaps another container on the same document, when the container of a flexible size is scaled up. Another problem occurs in that the font size become too little, when the font size is adjusted for the entire text to be displayed in a container and the amount of the text to be displayed is large.

As a technique for solving the problems, a technique is known that relates to a layout design device for scaling down the size of a container adjacent to another container to keep the distance between the containers, when the size of the second container is scaled up (for example, see Japanese Patent Laid-Open No. 7-129658 (0049, FIG. 8)).

Another technique is known that relates to a layout control device for controlling a layout when it outputs an image through a printing device, though the layout control device does not dynamically layout each object (container) again for the purpose (for example, see Japanese Patent Laid-Open No. 2004-15215).

As mentioned above, in a conventional layout system, a layout calculation can be performed for laid out containers so that the containers are in an optimal size to each other according to the size of the container to be inserted. The abovementioned layout system, however, does not consider a variable data print, thus, the system cannot apply to the variable data print performed with data inserted for each record from a database.

The applicant also considers a sub-template function for making a layout of containers a part of a document in advance. In this case, when the sub-template is laid out on the document, the size of the sub-template cannot be dynamically changed and the containers cannot be laid out with optimal sizes. With the size of the sub-template not being dynamically changed, the sub-templates cannot be set associated with each other and the optimal layout cannot be calculated with the sub-templates associated with each other.

SUMMARY OF THE INVENTION

The present invention has been proposed to solve the conventional problems, and has as its objects to provide a layout adjustment method and an apparatus and a program for the same for allowing a size and a layout of a sub-template to be preferably set and an intention of a user who performs the layout to be better reflected according to the size of contents to be affixed in the sub-template in variable data print.

In order to solve the abovementioned problem, the present invention is a layout adjustment method for determining a layout of a page to be formed on a printing medium, comprising:

a management step of managing template data including a basic layout with a plurality of partial areas, to which data is to be inserted, laid out in a page, wherein the plurality of partial areas are linked so that the plurality of partial areas work together to make their sizes variable;

a calculation step of calculating a size of each partial area appropriate for drawing data to be inserted in each partial area on the basis of the size of data to be inserted in the partial areas; and an adjustment step of adjusting a layout representing a size and a location of the plurality of partial areas in the page on the basis of relationship between a size of each partial area calculated at the calculation step and a link set for the plurality of partial areas in the basic layout;

wherein the management step manages template data including a sub basic layout with a plurality of smaller partial areas, to which data is to be inserted, further laid out in each of the partial areas, wherein the plurality of smaller areas are linked so that the plurality of smaller areas work together to make their sizes variable to make sizes of the partial areas variable.

In order to solve the abovementioned problem, the present invention is a layout adjustment apparatus for determining a layout of a page to be formed on a printing medium, comprising:

management means for managing template data including a basic layout with a plurality of partial areas, to which data is to be inserted, laid out in a page, wherein the plurality of partial areas are linked so that the plurality of partial areas work together to make their sizes variable;

calculation means for calculating a size of each partial area appropriate for drawing data to be inserted in each partial area on the basis of the size of data to be inserted in the partial areas; and adjustment means for adjusting a layout representing a size and a location of the plurality of partial areas in the page on the basis of relationship between a size of each partial area calculated by the calculation means and a link set for the plurality of partial areas in the basic layout;

wherein the management means manage template data including a sub basic layout with a plurality of smaller partial areas, to which data is to be inserted, further laid out in each of the partial areas, wherein the plurality of smaller areas are linked so that the plurality of smaller areas work together to make their sizes variable to make sizes of the partial areas variable.

In order to solve the abovementioned problem, the present invention is a program for causing a computer, which determines a layout of a page to be formed on a printing medium, to perform a management procedure for managing template data including a basic layout with a plurality of partial areas, to which data is to be inserted, laid out in a page, wherein the plurality of partial areas are linked so that the plurality of partial areas work together to make their sizes variable;

a calculation procedure for calculating a size of each partial area appropriate for drawing data to be inserted in each partial area on the basis of the size of data to be inserted in the partial area; and an adjustment procedure for adjusting a layout representing a size and a location of the plurality of partial areas in the page on the basis of relationship between a size of each partial area calculated by the calculation procedure and a link set for the plurality of partial areas in the basic layout;

wherein the management procedure manages template data including a sub basic layout with a plurality of smaller partial areas, to which data is to be inserted, further laid out in each of the partial areas, wherein the plurality of smaller areas are linked so that the plurality of smaller areas work together to make their sizes variable to make sizes of the partial areas variable.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5 is a diagram showing an example of a user interface in an embodiment including a menu bar, a tool bar, a work area and a floating pallet;

FIG. 6 is a diagram showing an example of display of a container on the user interface;

FIG. 14 is a diagram showing an example of display of a user interface when a container is located according to a flexible link;

FIG. 34 is a block diagram showing a function module configuration of a layout adjustment apparatus according to an embodiment of the present invention.

DETAILED DESCRIPTION OF THE PREFERRED EMBODIMENTS

Now, preferred embodiments of the present invention will be described with reference to the drawings.

<System Configuration>

Figure 1:
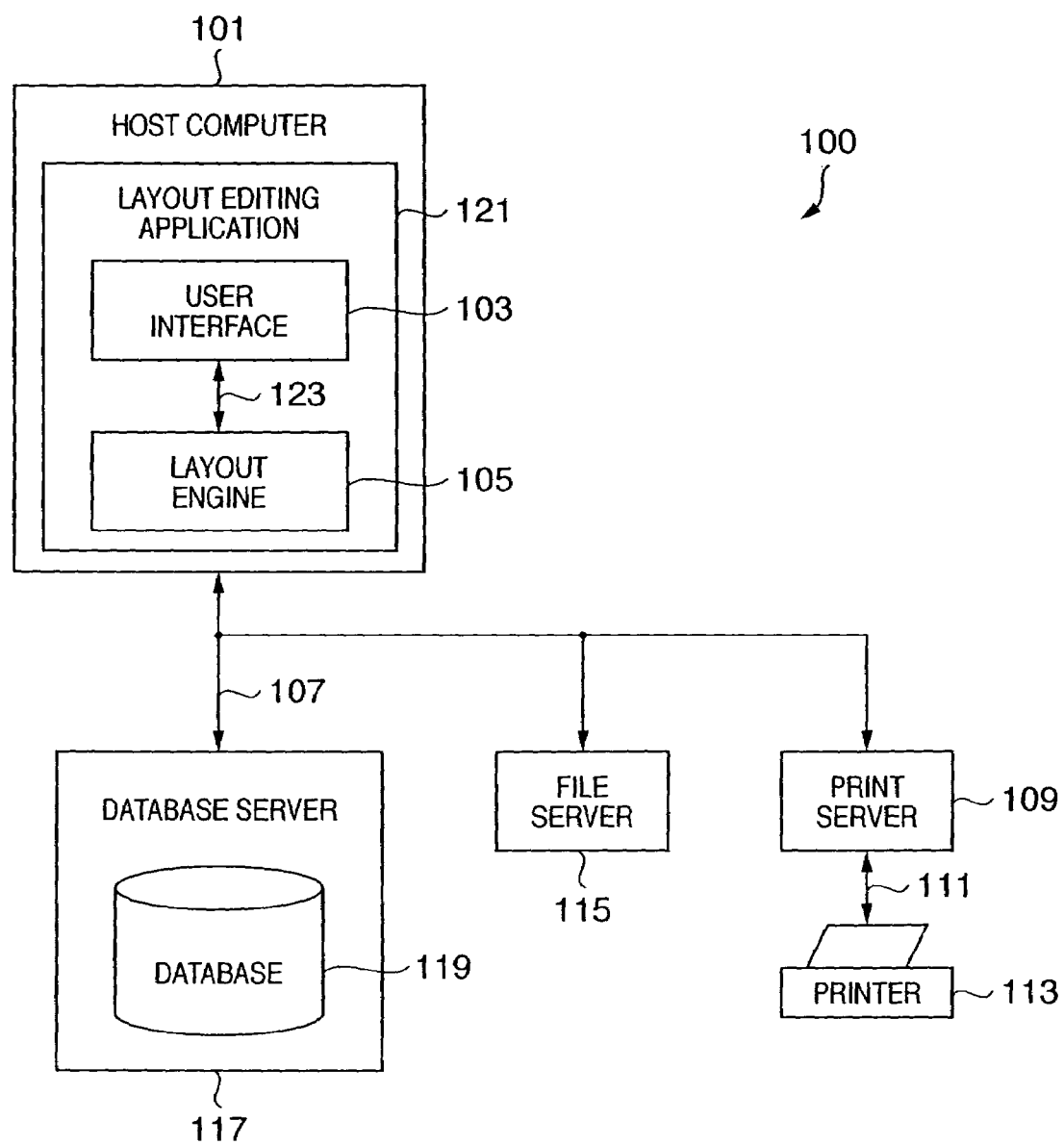
FIG. 1 is a block diagram showing an exemplary configuration of a variable print system 100 for printing a variable data document according to an embodiment of the present invention.
Figure 2:
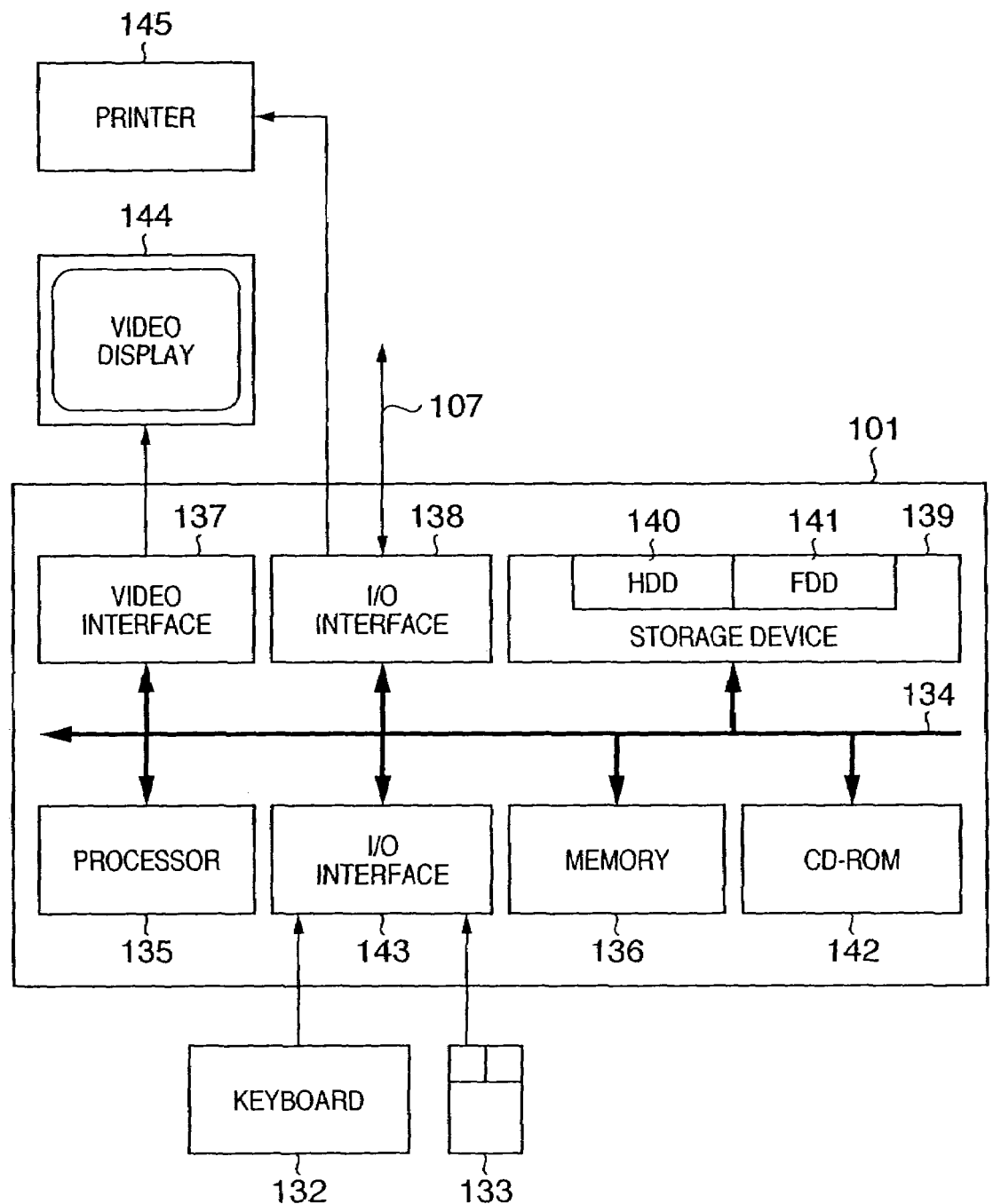
FIG. 2 is a block diagram showing a configuration of a host computer 101 shown in FIG. 1 in more detail.

First, a configuration of a variable print system according to an embodiment of the present invention will be described with reference to FIGS. 1 and 2. FIG. 1 is a block diagram showing an exemplary configuration of a variable print system 100 for printing a variable data document according to an embodiment of the present invention. FIG. 2 is a block diagram showing a configuration of a host computer 101 shown in FIG. 1 in more detail.

Variable print processing described in the embodiment is performed by the host computer 101 (configured by generic computer modules), which is a layout adjustment device. A layout editing application program 121 (layout adjustment program of the present invention), which can be implemented on the variable print system 100, is executed with the whole of or a part of its software executed on the host computer 101. Processes for layout edition or for printing a variable data document are particularly executed by software, which is executed on the host computer 101. FIG. 34 is a block diagram showing a function module configuration of a layout adjustment device according to an embodiment of the present invention.

The layout editing application program 121 is stored in a computer readable medium, loaded from the computer readable medium to memory 136 of the host computer 101 and executed. A computer readable medium storing such software or a computer program is a compute program product. By using the computer program product on a computer, a device preferable for layout edition or a variable print of a document is provided.

As shown in FIG. 2, a keyboard 132 or a pointing device or the like such as a mouse 133 is connected to the host computer 101 as an input/output device via an input/output interface 143. A display device (video display) 144 as an output device is connected via a video interface 137. A local printer 145 or the like can also be connected to via an input/output (I/O) interface 138. The I/O interface 138 also has a function of connecting the host computer 101 to a network 107. With the function, the host computer 101 can be connected to other computer units in the variable print system 100 via the network. A typical example of the network 107 includes a local area network (LAN) and a wide area network (WAN).

Also shown in FIG. 2, the host computer 101 includes at least one processor unit 135 and memory unit 136 including for example semiconductor random access memory (RAM) and read only memory (ROM). A storage device 139 includes a hard disk drive (HDD) 140 which can exchange data with a computer readable medium storing a program or the like and floppy (registered trademark) disk drive (FDD) 141. Although not shown in FIG. 2, a magnetic tape drive or the like is also available as the storage device 139. A CD-ROM drive 142 is provided as a non-volatile data source (of course, a CD-ROM can provide a computer program).

The host computer 101 uses components 135-143 of a computer module 101, which communicates via interconnect bus 134 according to an operating system such as GNU/LINUX or Microsoft Windows (registered trademark) or, typically an operating system, or by means of a conventional operation mode of a computer system formed by those well-known in the associated art. That is to say, each configuration of the abovementioned components 135-143 is communicatively connected via bus 134 and used by an operating system installed on the host computer 101.

Examples of the host computer 101 shown in FIG. 2 include an IBM compatible PC or SUN Sparcstation, or any computer system including them.

<Outline of Layout Editing Application>

In the embodiment, the layout application program 121 resides on the hard disk drive 140 and execution and reading of the program can be controlled by the processor 135. A medium storage device of a program of the layout editing application 121 and data to be fetched from the network 107 use semiconductor memory 136 in response to the hard disk drive 140.

As an example, an encoded program of the layout editing application 121 is stored on a CD-ROM or a floppy (registered trademark) disk, read through a corresponding CD-ROM drive 142 or a storage device 141 and installed on the hard disk drive 140. Alternatively, as another example, the layout editing application program 121 may be read from the network 107 into the host computer 101 and installed on the hard disk drive 140.

Software can be loaded into the host computer 101 from any other appropriate computer including a magnetic tape or ROM or an integrated circuit, a magneto-optical disk, or the Internet or an Intranet having wireless communication such as infra-red communication between the host computer 101 and another device, a computer readable card such as a PCM-CIA card, and an E-mail communication or record information on a Web site. They are merely an example of computer readable medium and it is apparent that other computer readable medium can be used.

In FIG. 1, the layout editing application 121 of the present invention is for causing a computer to perform a variable print (also called as variable data print (VDP)) and includes two software components, i.e., a layout engine 105 and a user interface 103. The layout engine 105 is a software component for reading variable data stored in a database 119 on a one-by-one record basis according to restrictions on size or location given to a container (a rectangular area), which is a partial area, and calculating the size or the location or the like of the container, to which read data is to be inserted, according to the read data and a restriction on the container.

Also in the embodiment, the layout engine 105 also draws data allocated to a container and generates an image of a variable data document. The present invention is not limited to this embodiment. The layout engine 105 may operate as an application for determining the size and the location of each partial area (container) and output drawing information to a printer driver (not shown) to cause the printer driver to perform a drawing process of an image of a variable data document and generate print data. The user interface 103 allows a user to set a layout or attribute of a container and lets the user to create a document template and a sub-template as described below. The user interface 103 provides a processing method for setting a link to associate each container in the document template with data source. The user interface 103 and the layout engine 105 communicate via a communication channel 123.

Figure 3:
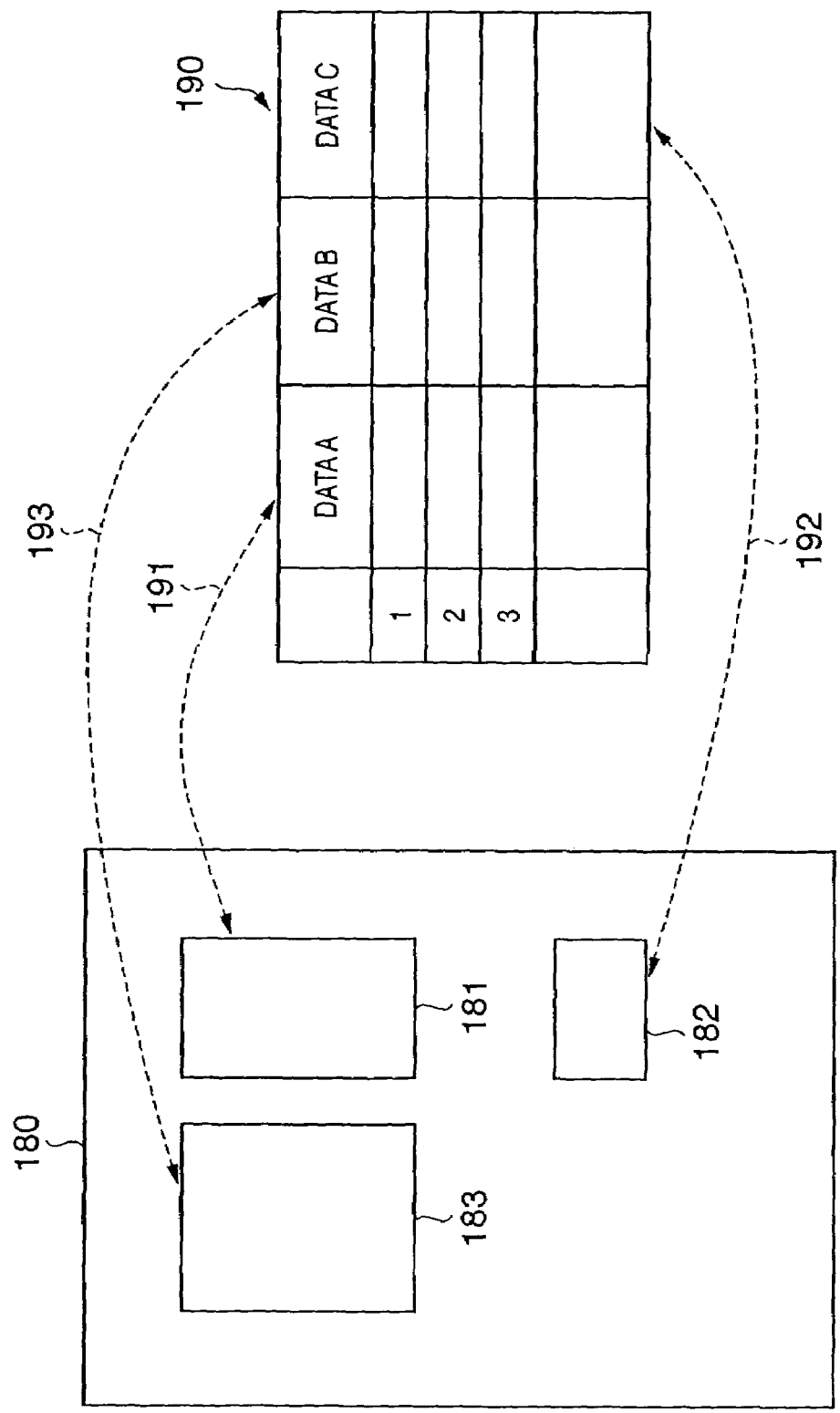
FIG. 3 is a diagram illustrating an outline of a variable data print in an embodiment of the present invention.

FIG. 3 is a diagram illustrating an outline of a variable data print in the embodiment of the present invention. A document template 180 is generated by locating a plurality of containers 181-183 on a page according to an instruction operated by a user and giving restricting conditions on a location or a size to each container via a user interface module 103 (hereinafter described as "user interface 103") of the layout editing application 121.

The user interface 103 associates the document template 180 with a data source 190 and further associates each container with each data field in the data source 190 (administration unit 3401). Association information indicating the association between each container and each data field in the data source 190 is described in the document template, which is stored in a HDD 140. The data source 190 is a file describing entry data on a one-by-one record basis that is stored in the HDD 140. A sub-template to be laid out in the document template is also stored in HDD 140.

The layout engine 105 reads (acquisition unit 3407) data associated with each of containers 180-183 of the document template in the association information from the data source 190 according to a print instruction or a preview instruction from a user, inserts the data on a one-by-one record basis (for example, the data fields A-C of a data record 1 are inserted into containers 181-183), and adjusts (layout processing unit 3408) the size or the like of each container according to the inserted data (layout adjustment).

In case of a preview instruction, a document image adjusted for layout is generated and outputted to display the document image as a preview on a screen of a video display 144. In case of a print instruction, a document image generated by using the layout engine 105 or the print driver is outputted to a print server 109 as print data. By processing data record 1, 2, 3 . . . successively, a variable data print is achieved (print unit 3409).

The data source (190) for generating a document may be a general database 119 on a database server 117, for example, which is included in another computer operating a database application. In this case, the host computer 101 can communicate with the database server 117 via the network 107 and obtain a data source. The document template (180) for a variable data print generated by the layout editing application 121 is saved at the host computer 101 or a file server 115 formed by another computer.

As shown in FIG. 3, the layout engine 105 of the layout editing application 121 generates a variable data document including a document template merged with data. The documents is saved at a local file system of the host computer 101 or saved at the file server 115 or sent to a printer 113 for printing. The print server 109 is a computer for providing a network function for the printer 113, which is not directly connected with a network. The print server 109 and a printer 113 are connected via a general communication channel 111.

<Other System Configuration Examples>

Figure 4:
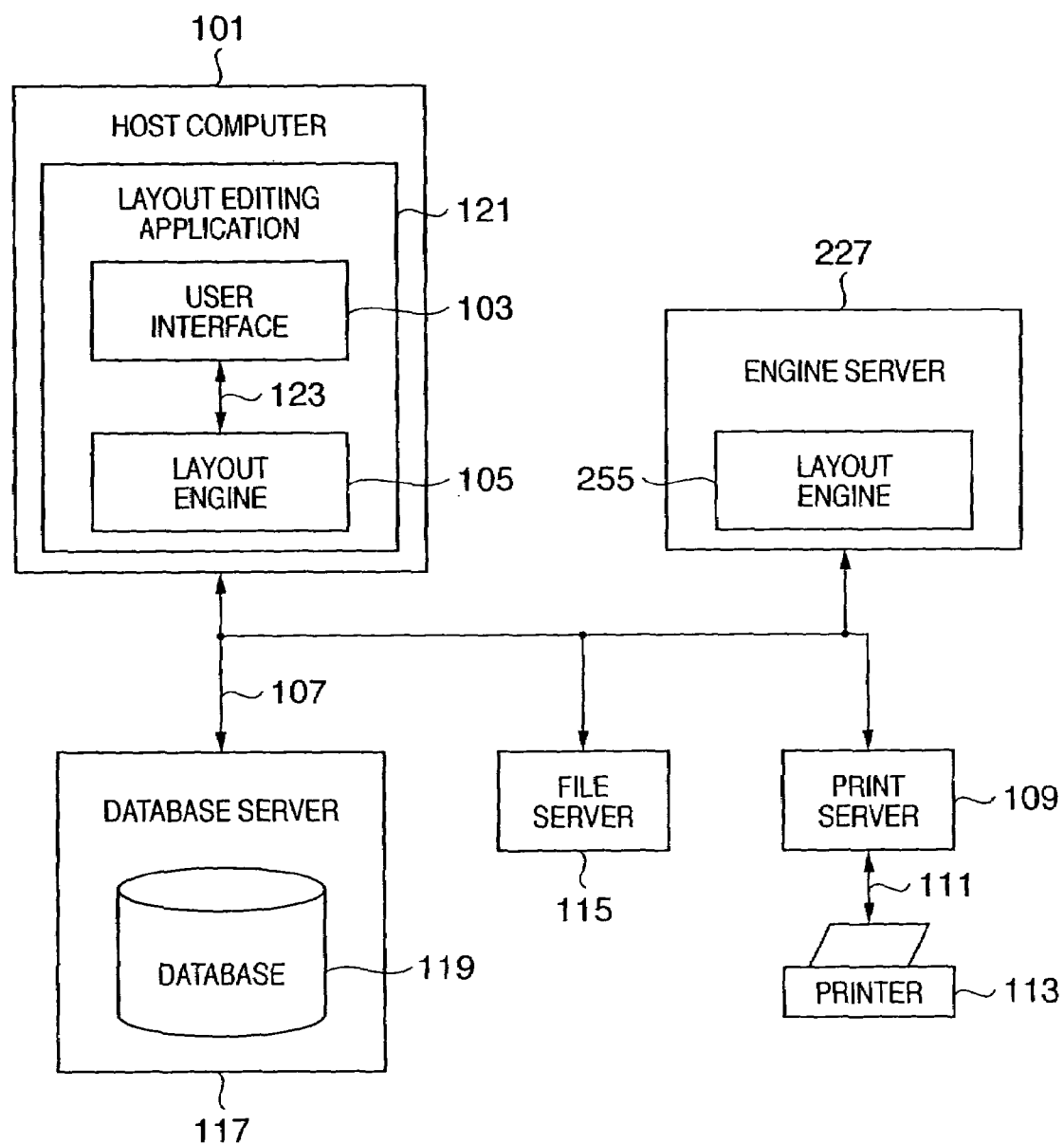
FIG. 4 is a block diagram showing another exemplary configuration of the variable print system 100 for printing a variable data document according to an embodiment of the present invention.

FIG. 4 is a block diagram showing another exemplary configuration of the variable print system 100 for printing a variable data document according to an embodiment of the present invention. The variable print system 100 shown in FIG. 4 is a block diagram with a configuration similar to that of FIG. 1 but different in that it is added with an engine server 227. A layout engine 225 stored in the engine server 227 is a separated version of the layout engine 105.

As an engine server 227, a general computer is used. The layout engine 225 couples a document template saved at the file server 115 with data saved at the database 119 to generate a variable data document according to a printing or other purpose. Such an operation is required via a user interface 103.

<Description of Layout Editing Application>

The layout editing application 121 will be described in detail below.

[Main Window]

FIG. 5 is a diagram showing an example of a user interface in an embodiment including a menu bar, a tool bar, a work area and a floating pallet. The user interface 103 displays a user interface screen formed by an application window 301 as shown in FIG. 5 on the video display 144 at operation. The window 301 has a menu bar 302, a tool bar 303, a work area 306 and an optional palette 311. The menu bar 302 and the tool bar 303 can be made non-display or moved to various locations on the screen. The location of the work area 306 can be moved by operation of the mouse 133. The palette 311 is optional, on which a cursor/pointing device 313 represents the location the mouse 133 specifies.

The menu bar 302 has many menu items 304, which are extended under hierarchy of menu option, as known as well-known art.

The tool bar 303 has many tool buttons and widget 305, which can be in non-display state or a display state according to a special mode of an application.

A ruler 308 is optional and used for indicating the location of a pointer, a page, a line, a margin guide, a container or an object in the work area 306.

The palette 311 is used for accessing an additional function such as a variable data library. The palette 311 has a window control 312 for moving, resizing and closing a window. The palette 311 is optional and displayed on the foreground of the work area 306 or hidden behind an object. The palette 311 is restricted to be displayed within the area of the application window 301 or allowed to be displayed in part or in entire outside the application window 301.

On the tool bar 303, "buttons", which can be selected by a user, are located as shown in FIG. 6. FIG. 6 is a diagram showing an example of display of a container on the user interface. The buttons shown in FIG. 6 will be described below.

(1) selection tool button 403: used for selecting, moving and changing the size, resizing and locking/unlocking an edge of a container. A container is selected by dragging a selection box to surround the container. A plurality of containers can be selected with a selecting operation for the plurality of containers with pressing a CTRL key.

(2) text container tool button 404

This is used for creating a container having a static or variable text.

(3) image container tool button 404

This is used for creating a container having a static or variable image.

(4) link tool button 406

This is used for creating a link for associating containers and also used for controlling a distance between links.

The application window 301, shown in FIG. 5, of the layout editing application 121 can determine a basic layout by laying out each container or each link in a page. The basic layout is an underlying layout for a variable data print. When each container in the basic layout is a fixed container, printed results for all the records have the same layout. When each container in the basic layout is a flexible container to be described later, the size or the location of each container varies within the restriction to be described later according to the amount or the size of data to be read on a one-by-one record basis. The document template created by the layout editing application 121 is for determining the basic layout. When a flexible container is included in the basic layout, the layout of the final printed material is adjusted for layout by read in data.

As described later, the document template of the present invention allows a user to layout one or more sub-templates, each of which having a sub basic layout as the document template has the basic layout. The basic layout and the sub basic layout have a data area (container), to which data of each record to be inserted, and a link indicating that data areas are associated with each other.

[Document template]

In FIG. 5, the work area 306 is used for displaying and editing a design of a document template (180: basic layout). This enables a user to see an outline of a document to be printed out while the user is designing the document template. Accordingly, the user can easily recognize how a document merged with the data source (190) changes according to the amount and the size of a variable data.

When a data source is associated with a document template, the current document is displayed on each container, in which a corresponding variable text or an image is laid out, for preview.

A document structure and a visual mark (a frame line of a container, an anchor, a slider, a link, etc.) for drawing a variable container in a document template are always displayed while the document template is created. The visual mark is displayed only when a user moves a cursor to a container or selects a container in previewing for inserting variable data.

The work area 306 includes a scroll bar 307, an optional ruler 308 and a document template 309. The document template 309 can indicate that the document has a plurality of pages. The document template 309 is what displays the document template 180 of FIG. 3.

The page size of the document template given is specified by a user with a well-known technique. For example, a user selects "Page setting" from "File" on a menu to display a dialog for setting the page size. The page size specified by the user will be reflected on the page. The actual number of pages of each document may vary according to variable data in an associated data source. This is because an additional page is automatically created when a field whose size changes according to the amount of variable data, such as a variable table, is set in the document template and variable data which cannot be fit in a page is read in.

The border line 310 shown in each page is an arbitrary page margin for indicating the maximum width of an object which can be printed on the page.

FIG. 6 shows exemplary objects which can be displayed on the document template 309 for a single page. Such objects include containers 407 and 408, an arbitrarily applied anchor icon 409, fixed edges 411 and 414, an unfixed edge 410, a link 412 and a slider 413. The anchor icon 409 can be set on a corner or a edge of a rectangle container or in the center of a container. When the anchor icon 409 is set, the place where the icon is set is fixed.

In the example shown in FIG. 6, the anchor icon 409 is set on the upper left corner of the container 407. This means that when variable data is inserted in the container 407 and the size of an image or the amount of text of the variable data is too large for the container 407, the anchor icon 409 can be extended to right and downward. When the anchor icon 409 is set on an edge, the edge is fixed and the other three edges can be extended in respective directions. When the anchor icon 409 is set in the center of a container, the center of the container is fixed and four edges can be extended in respective directions with keeping the center of the rectangular container fixed.

Although the link 412 will be described in detail later, it represents that the container 407 and the container 408 are associated with each other and that the container 408 can be moved to right with keeping the length set for the link (the limit for the length can be specified). The slider 413 represents that it can move in parallel with the set edges.

[Container]

Now, a container will be described. A container is a space (referred to as "a partial area") in a document template, into which a fixed or a variable text/image is inserted from a variable data file for drawing. A container is laid out with the other containers or objects as shown in FIG. 6. A container is moved, adjusted in size and recreated according to the user's indication on a user interface screen by manipulating the mouse 133.

More accurately, a container has a set of setting, visual representation and an interaction and editing operation. The container according to the embodiment will be defined as below.

(1) A container has fixed or variable contents. The variable contents can be said dynamic in that data obtained from a data source can differ for each document, i.e., for each record. As contents which is animated or which change as time goes on in the other manner is not appropriate for printing, the variable contents according to the embodiment does not include such contents here. Similarly, the fixed contents are displayed in the same way for all the documents generated by using a container. When a link is set between the fixed contents and the variable contents, however, the place of fixed contents may be susceptible to the variable contents and differ for each document.

(2) A container has ornament functions similar to those of text setting, including background colors, borders, and font styles to be applied to contents. This type of setting is called a container attribute. Though the container attribute can be set for each container, a container can be also set to have the same container attribute as another container.

(3) A container is merged with data from a data source when a document is generated. The ornament functions are visible on the printed material as they are in any fixed contents. The variable contents provide a display of specific data from a data source. The represented containers can be printed out and/or displayed on a screen of the video display 144, for example.

(4) A container has a user interface as a visual mark as shown in FIG. 6. For example, a container has an interactive graphical user interface (GUI) for editing the container and setting the display. Each element of the GUI is displayed on the screen of the video display 144 but not printed out on a document. The user interface 103 of the layout editing application 121 displays some of ornament functions of the container such as background colors or fonts and has a function for allowing the edition and display of the container setting.

[Restriction on Container]

A container is restricted on controlling how it is associated with contents displayed for each document. The restriction (including the association of fixed/variable contents with a container.) is a main method for a user to control generations of a plurality of documents from a document template. An example of the restriction is "The contents of this container should be four inches high at the most." Another example of the restriction is "The left edge of the contents of this container should be displayed at the same horizontal level for every document." Those what described here are various ways for displaying and editing such restrictions by using a GUI.

As an image has a location defined on a page, a contents place holder for specifying a location of fixed contents is well-known in a digital print art. The container has a location and a size, which are generally edited and displayed according to a user's instruction. Therefore, automatic display and edition in a manner specialized for a variable data print where data of each record is inserted from a database will be described below.

With a container, a user can specify the size (drawing size) or the location of contents in a document. As many types of documents are generated from a document template, many capabilities and restrictions are set for a container. A predetermined user interface is used for setting (specifying) or displaying them.

An edge of a container defines a virtual border for associated contents to be displayed in a document. Therefore, describing the left edge of a container is the same as describing the leftmost edge in an area, in which associated contents can be displayed in each document. Similarly, describing the height of a container is considered as the same as describing a restriction on the height of associated contents in a generated document. In this specification, they will be apparently distinguished from each other when an edge or a size of a container is described with reference to the user interface 103.

A term "fixed", which defines a certain value used for restricting a display of contents, is the same for all the documents in the description below.

(1) When a width of a container is fixed, a width allocated to associated contents is the same for all the documents.

(2) When a height of a container is fixed, a height allocated to associated contents is the same for all the documents.

(3) When a distance (a length of a link) is fixed, the specified distance is restriction for all the documents.

(4) That left and right edges of a container are fixed means that a location in the horizontal direction of an edge to the page is the same for all the documents. The height or a location in the vertical direction of a container, however, may vary. For example, when the left edge of a container is fixed, the location to display the associated contents is such that the left edge of the contents is the same horizontal location for all the documents but the contents may be displayed upper part of a page in a document and lower part of a page in another document.

(5) That the upper edge and the bottom edge of a container are fixed means that the vertical location of an edge in a page is the same for all the documents. The width or the horizontal location of a container, however, may vary for each document.

(6) A vertical axis of a container is parallel to the right edge and the left edge of a container and a virtual vertical line located midway between the edges. When the vertical axis of the container is fixed, an average of horizontal locations of the left edge and the right edge of the container (i.e., the central location between the left and the right edges) is the same for all the documents. With this restriction, the width of the container may vary. The vertical axis, however, is at the same horizontal location for all documents, from a document, in which the left and right edges are located at the farthest location from the vertical axis, to a document, in which the left and right edges are located at the closest location from the vertical axis. The height and vertical location of the container is not affected by this restriction.

(7) Similarly, when a horizontal axis is fixed, an average between the upper edge and the bottom edge of the container is located at the same location in the vertical direction. The width and the horizontal location of the container, however, are not affected by this restriction.

(8) That both of a horizontal axis and a vertical axis are fixed means that the central location of the container is fixed. The width and the height of the container, however, are not affected by this restriction.

(9) When a corner location of a container, a midway location between the edges of a container or a center location of a container is fixed, each location is the same in all the documents. For example, that the upper left corner of a container is fixed means that the upper left location of the located container is the same for all the documents.

(10) A vertical edge or a vertical axis can be fixed by being associated with the left edge or the right edge of a page or the left page margin or the right page margin, or the other horizontal locations. Similarly, a horizontal edge or a horizontal axis can be fixed by being associated with the top edge or the bottom edge of a page or the top page margin or the bottom page margin or the other vertical locations.

The term contrast to "fixed" is "flexible", which means an edge, an axis, a corner, a midway location or a document restriction may vary for each document (each record). For example, a layout is expected to be dynamically changed in a page according to the size or the amount of variable data, though, a specific container may be desired to be fixed in the size or the location or in the four corners of the container at the corner of the page. For that purpose, the layout editing application 121 according to the present invention is adapted to set the edge, the axis or the midway location or the like of each container (partial area) fixed or flexible. This enables a user to create a basic layout of the document template 180 as the user desires when the user determines the basic layout.

[Display and Edition of a Container]

<<How to Create a New Container>>

The container is described in two ways; a text container and an image container. The text container has text and an embedded image. The image container only has an image.

As shown in FIG. 6, a new text container or an image container is created on a document template 309 by a user clicking the mouse 133 on a text container tool 404 or an image container tool 405 and dragging a square over the document template 309.

Alternatively, the container may be created by a user making appropriate tools 404 and 405 active and simply clicking the mouse button on the document template 309. In this case, a container of a default size is inserted in the template in response to the clicking of the mouse 133 and a dialog box or other prompts for allowing the user to set the size or the like of the new container are provided to the user.

The size of the container can be predetermined automatically or can be created, located or the like by using a calculated schema. A user can set a restriction on the container by selecting the generated container with input means such as a mouse and specifying a property by clicking the right mouse button on the container to display a property dialog of the container. The abovementioned various restrictions can be set on the property dialog UI of the container (corresponding to partial area setting means). With a property dialog of the container, a user can determine the size (width, height) or the location of the container. If a user wants to set the container to a flexible size, the user can set a basic pattern (basic size and reference location) of the container and further set the maximum container size (width, height) and the minimum container size (width, height).

[How to Display a Container]

FIGS. 7A to 7D are diagrams illustrating a rule for displaying containers in an embodiment. Specifically, diagrams in FIGS. 7A to 7D exemplify rules for displaying about edges of a container.

The application 121 represent the state of an edges of a container by displaying an edge with a solid line (item 503) or a dotted line (504) as well as using an anchor (a line, a shape or an icon denoted by 506, 507 and 509 drawn near the edge), a handle (a control point drawn over or near the edge of a area to move or modify the edge, 502), a slider (short parallel lines drawn at both sides of the edge, denoted by 413 in FIG. 6), a scaling icon (505) and colors.

Rules for displaying a container shown in diagrams in FIGS. 7A to 7D are shown below.

(1) Draw edges by solid lines in order to fix them.

(2) When a width is fixed, the left and right edges are drawn by solid lines.

(3) When a height is fixed, the upper and bottom edges are drawn by solid lines.

(4) Draw no axis.

(5) Scaling icons are drawn near edges which are not drawn in accordance with rules (1)-(3) with the edges being drawn by dotted lines.

(6) If both lines in the pair of a vertical line and a horizontal line or both axes in the pair of a vertical axis and a horizontal axis are fixed, an anchor is drawn at the cross-point of the lines or the axes.

(7) If no anchor is drawn at the fixed edges, a slider is drawn at the center of each of the edges.

(8) If no anchor or slider is drawn in each pair of a vertical edge and a horizontal edge or a vertical axis and a horizontal axis, a handle is drawn at the cross-point of the lines or the axes.

Lines defined by the abovementioned rules (1), (2) and (3) are drawn by solid lines as they are fixed or restricted as mentioned above. A flexible edge is drawn by dotted line according to the rule (5). The fixed point defined by rules (6), (7) and (8) displays an anchor, and some fixed edges display sliders and the others display handles.

A restriction set afterwards by a user has a priority in the abovementioned rules. That is to say, when another restriction is set afterwards and the abovementioned rules affect edges to be drawn, contents of solid lines or dotted lines will be changed.

Where a flexible edge is to be drawn depends on the contents of the container. As described later, "dynamic proofreading", which means that contents are merged with a document template and it becomes visible in a user interface, is used as described later. Alternative implementation can be used in a contents area of a container averaged for all the documents or in the other means for determining where a flexible edge will be laid out on a user interface.

These kinds of contents representation provide graphical means for displaying the state of each edge of a container. The interpretation of the representation is shown below.

(1) As an edge denoted by 410 in FIG. 6, a dotted line means that the location of an edge in a document depends on the contents of the container.

(2) A solid line means that the edge is restricted because it is fixed (edge 414) or the width and height of the container is fixed (four edges are drawn by solid lines in the container 408 with both edges fixed).

(3) An anchor means that a cross-point of edges or axes is fixed. Therefore, the anchor point will appear at the horizontal location and the vertical location for all the documents. The anchors are fixed as a matter of course. The icon 409 shown in FIG. 6 is an example of an anchor-icon, which means that the cross-point on the edge 414 is fixed.

(4) A slider means that a length of an edge associated with the slider may move in parallel even though it is fixed. For example, the slider 413 may be displayed to the left or right of the location where contents of the container 408 is displayed in a specific diagram in a document in FIG. 6. For example, if the size of an image or the amount of text for data to be inserted in the container 407, which is associated (has a link set) with the container 408, is too little, the size of the container 407 will be smaller so that the container 408 will be displayed as it is laid out after sliding to the left (moving in parallel). If the size of the container 407 is too large, the container 408 will be laid out after sliding to the right on the contrary.

Some or all of the icons and edges may or may not be drawn depending on which tool or container is selected, highlighted or activated. Generally, an edge or an icon of the container is not drawn on a printed material as it is just for helping a user in designing a document template.

As mentioned above, setting of the basic pattern of a basic value, the minimum value and the maximum value of the width and the height of the container is displayed in the secondary dialog window.

Figure 7A:
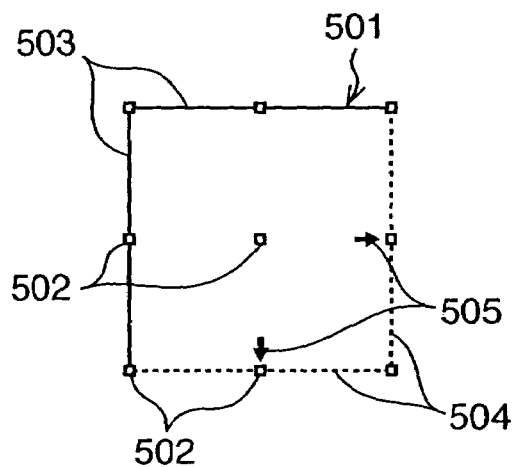
FIGS. 7A to 7D are diagrams illustrating a rule for displaying containers in an embodiment.

In FIG. 7A, neither of the width and height of a container 501 is fixed and they are flexible. The fixed edge 503 is shown by solid line and the flexible edge 504 is shown by dotted line. A scaling icon 505 indicates that the adjoining edge 504 is flexible. Indicators in other forms can be used in the place of or in addition to this.

Figure 7B:
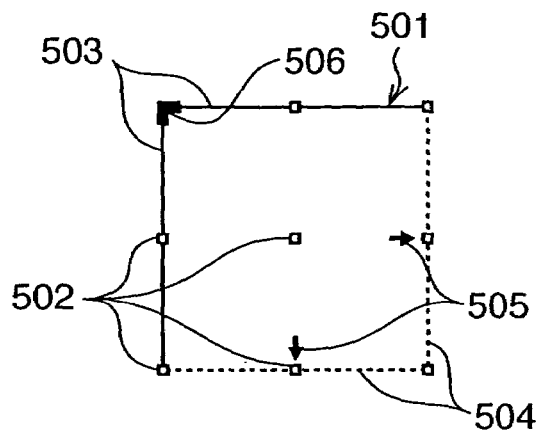

In FIG. 7B, both the width and height of a container 501 is flexible. An anchor icon 506 is added to apparently represent that the location of the corner of the crossing edges 503 is fixed.

Figure 7C:
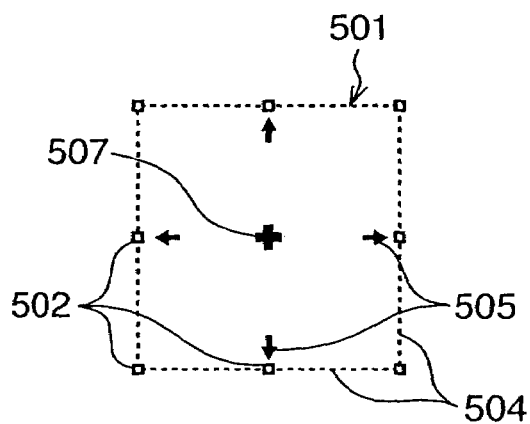

In FIG. 7C, both the width and height of a container 501 is flexible and the container 501 can be extended in each direction by an equal distance from the center shown by the given anchor icon 507. That is to say, the container 501 can be scaled up or down centering on the anchor icon 507. Scaling up/down here is adjusted in the layout to keep the location of the anchor icon 507 as the center of the container 501.

Figure 7D:
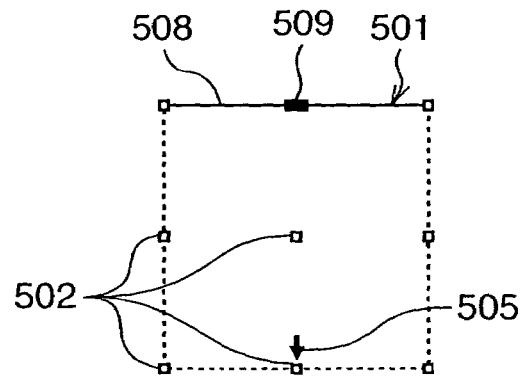

In FIG. 7D, the upper edge 508 is fixed but both the width and height are flexible for the container 501. The anchor icon 509 located and shown in the center of the upper edge 508 is fixed. The left edge and the right edge (502) of the container 501 are scaled up or down around the center axis (vertical axis) through the anchor icon 509.

[How to Set a Link]

Figure 8:
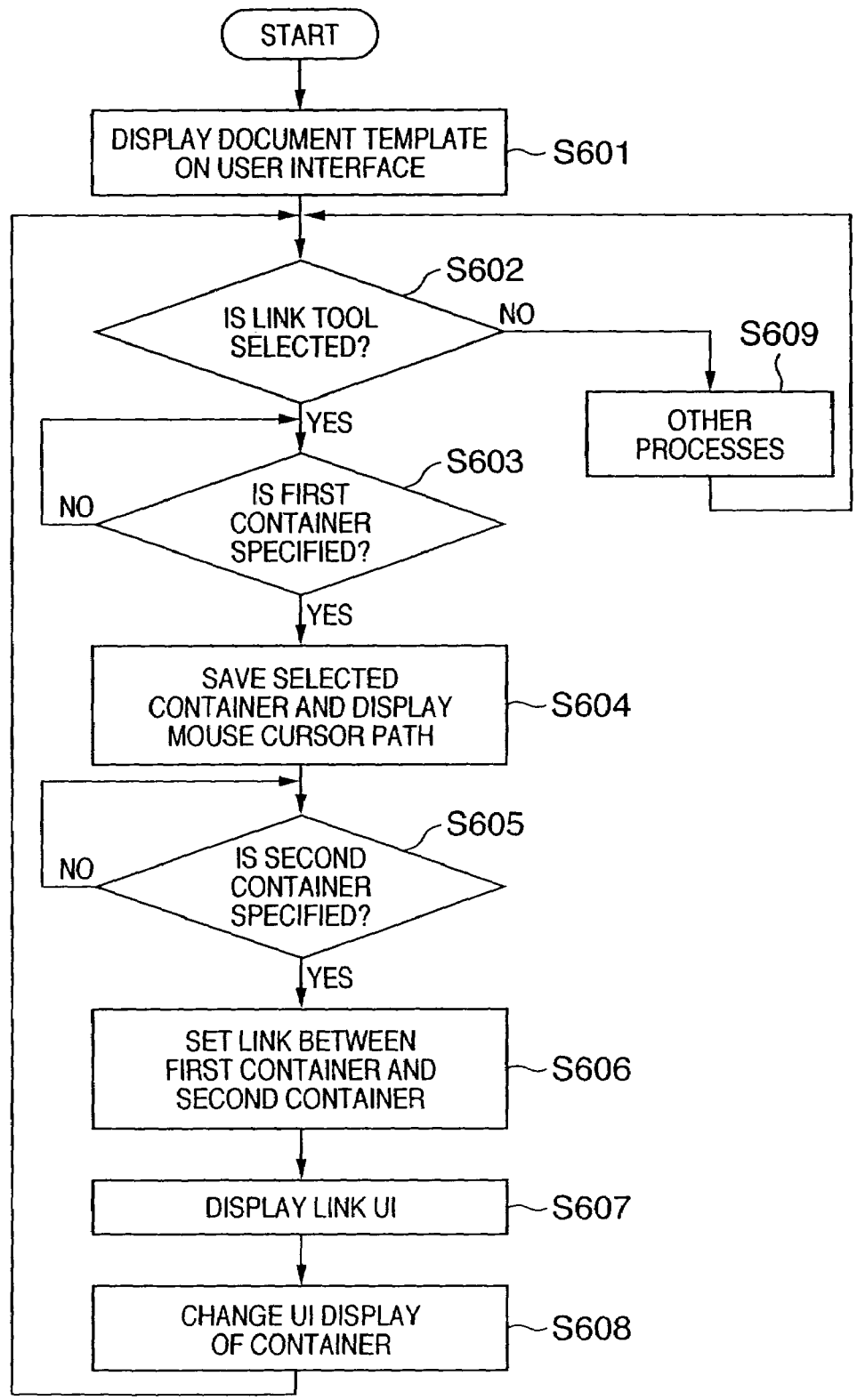
FIG. 8 is a flowchart for illustrating a way for setting a link in an embodiment.
Figure 9A:
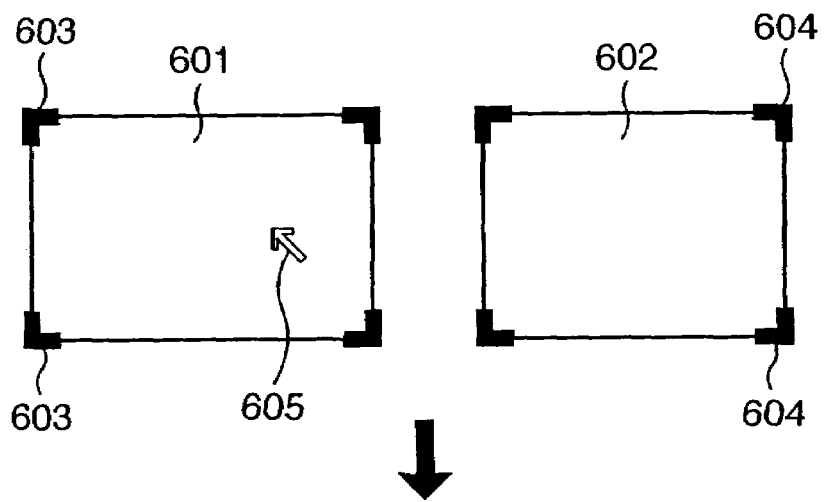
FIGS. 9A to 9C are diagrams showing examples of transition of the user interface (UI) in setting a link in an embodiment.
Figure 9B:
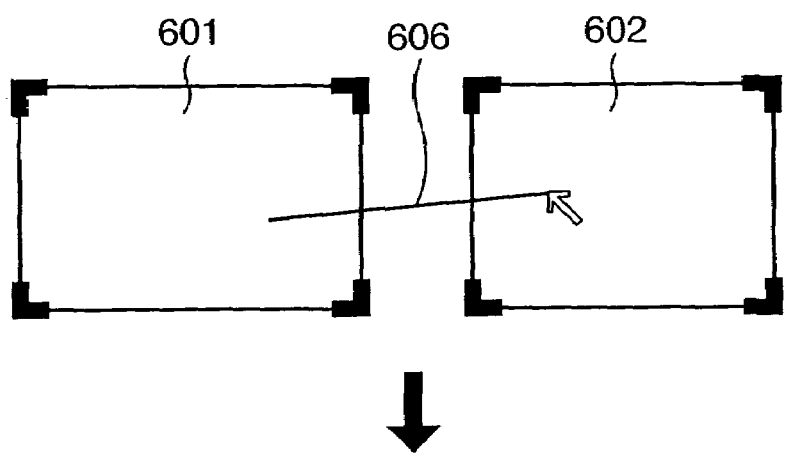
Figure 9C:
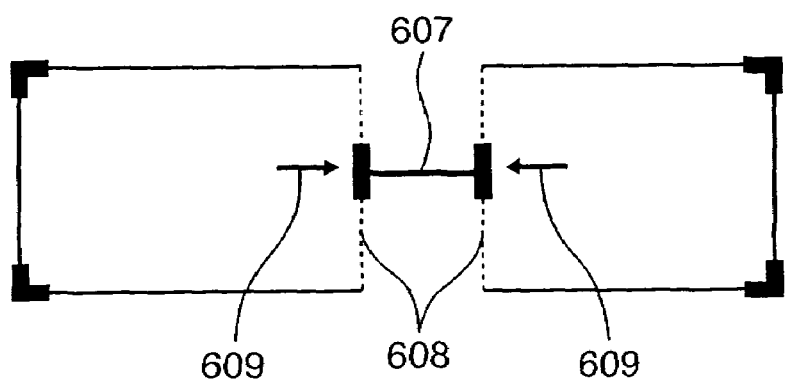

Next, setting of a link for associating containers each other will be described. FIG. 8 is a flowchart for illustrating a way for setting a link in an embodiment. FIGS. 9A to 9C are diagrams for showing examples of transition of the user interface (UI) in setting a link in an embodiment. How to set a link between containers will be described below with reference to FIGS. 8 and 9A to 9C.

First, the layout editing application 121 displays a document template selected to be edited on a work area 306 of a user interface screen (step S601). In order to set a link, (at least two) containers for setting a link need to be created on a document template. FIGS. 9A to 9C show examples of transition of the user interface when two containers are created and a link is set at step S1601.

Next, the layout editing application 121 determines whether the abovementioned link tool is in the selection state (it enters in the selection state when a user clicks the button 406 in FIG. 6 on it) (step S602). When the link tool is not in the selection state (No), various other processes are performed as required (step S609), then the operation returns to step S602.

In FIG. 9A, the containers 601 and 602 are considered as formed by fixed edges only. The reference numbers 603 and 604 denote the same as that denoted by 409 in FIG. 6, indicating an anchor. The reference number 605 denotes a mouse pointer. While the link tool is in the selection state, a user selects one of two containers (for example, container 601) for setting a link by clicking the mouse button on it.

In response to this operation, the user interface 103 of the layout editing application 121 recognizes that a first container is specified (step S603) and saves the information specifying the selected container. The user interface 103 also makes a subsequent mouse cursor path displayed on a screen in accordance with its movement (step S604). For example, a line 606 in FIG. 9B indicates a line connecting the location clicked in the state of FIG. 9A and the current location of mouse cursor. This UI can indicate to the user where the link will be set.

Next, the user moves a mouse pointer to the other container (for example, container 602) as shown in FIG. 9B and clicks the mouse button on it. In response to this operation, the user interface 103 recognizes that a second container is specified (step S605). Then the layout editing application 121 sets a link between the first container saved at step S604 and the second container whose specification is recognized at step S605 (step S606).

When a link is set between two containers 601 and 602 selected by the user in this manner, a link UI 607 is displayed (step S607). In response to this link setting, the display state of the container becomes that of FIG. 9C (step S608). That is to say, the UI of the container is automatically changed according to the link setting. The edges associated by the link are flexible here, indicated by dotted lines. In FIG. 9C, the reference number 608 denotes an edge indicated by dotted line, representing a flexible edge as described above.

The change in the state of an edge of a container as shown in FIG. 9C is automatically performed when the link setting requires the edge of the container to be flexible. This change is made so as not to cause the contradiction that all the edges are fixed though the links are set. The reference number 609 denotes a mark visually indicated to a user a direction in which the container may be changed due to the link set, same as the reference number 505 in FIGS. 7A to 7D. In the example of FIG. 9C, the right edge of the left container and the left edge of the right container changed into the flexible state, though, this is merely an example and the right container may change into a setting with a slider denoted by 413 in FIG. 6.

The layout edition of a document template by using the user interface 103 has been described. Adjustment of the container layout in accordance with data size (drawing size) will be described below for the case that a data source is inserted into each container.

<Layout Calculation by a Layout Engine>

[How to Calculate a Layout (Entire Flow)]

The layout editing application according to the embodiment is divided into two modes; a layout mode for creating a layout by creating containers by using the user interface 103 and associating between the containers (setting a link), and a preview mode for previewing a result of layout after a record is actually inserted by inserting each record of a data source into the layout created by the layout engine 105. In the preview mode, an actual record is inserted and the layout is calculated according to the abovementioned priority order, though the preview mode is for calculating a layout on a display. When the record is actually printed, the layout engine 105 also calculates the layout by inserting data into each container, though the calculation is performed in the same manner as that in the preview mode.

Figure 10:
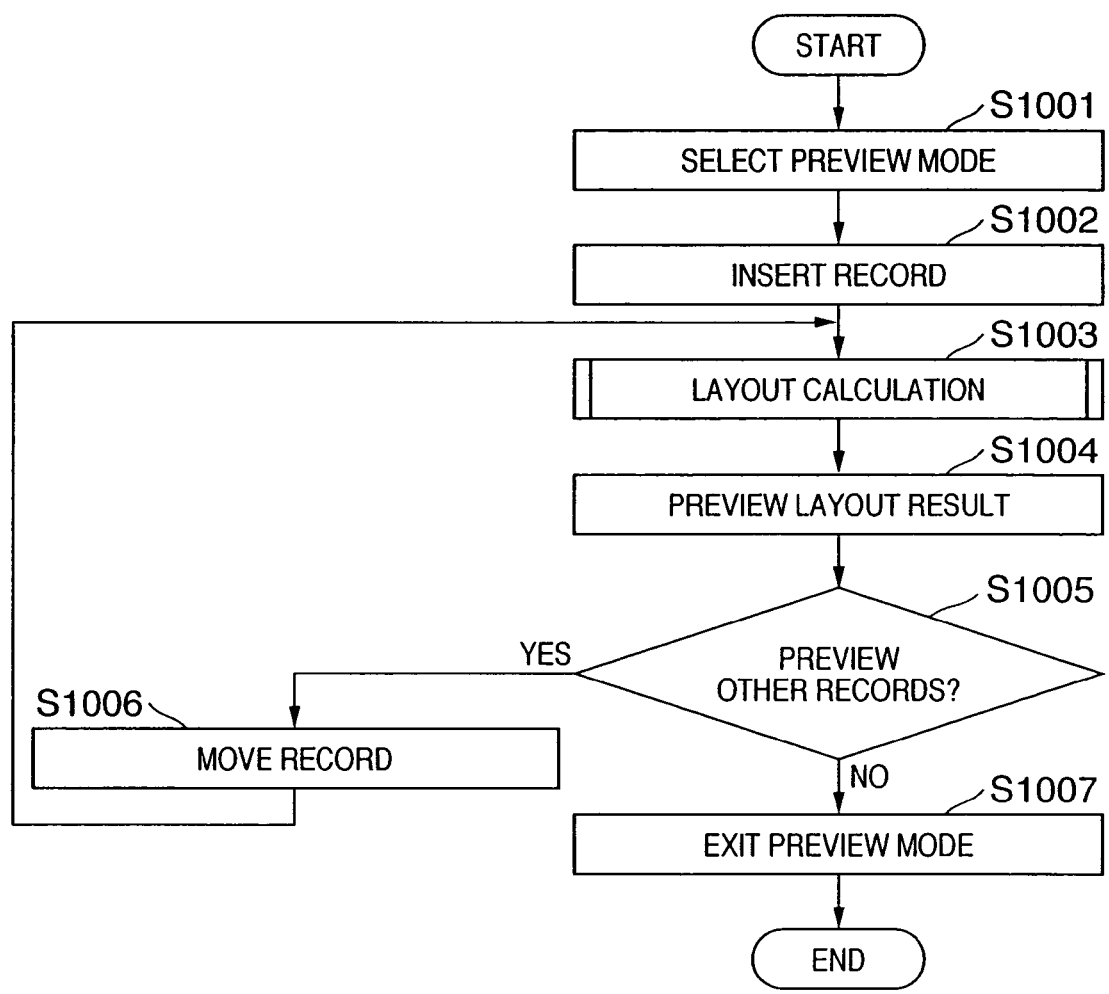
FIG. 10 is a flowchart for illustrating a layout calculation processing procedure by a layout engine of an embodiment of the present invention.

FIG. 10 is a flowchart for illustrating a layout calculation processing procedure by a layout engine of an embodiment of the present invention. First, a preview mode is selected (step S1001). When the preview mode is entered, the layout editing application 121 makes the user to select a record to preview from the data source and determines that each field data of the selected record is to be inserted into each container (step S1002).

When a field data is determined to be inserted into each container, the layout editing application 121 calculates for laying out the record and adjusts the layout as required (step S1003). Details of the layout calculation at step S1003 will be described later. The layout editing application 121 displays the layout calculated at step S1003 (step S1004).

The layout editing application 121 determines whether the other records will be previewed or not on the basis of the instruction from the user (S1005). If it is determined that the other records need not to be previewed at step S1005, the layout editing application 121 exits the preview mode (S1007). If it is determined that the other records is to be previewed, the layout editing application 121 selects another record, calculates the layout again and preview the record (step S1006).

In order to print the record instead of in the preview mode, the layout is calculated for all the records to be printed in order. Therefore, step S1004 does not present and determination is made about whether all the records to be printed are processed at step S1005. At step S1003, the result of layout calculation is outputted in the manner of drawing, generated as print data by using a printer driver and the print data is outputted to a printer. In this case, the processing described here finishes when the print data has been outputted for all the records (all the records specified to be printed).

[How to Calculate a Layout (in Detail)]

Figure 11:
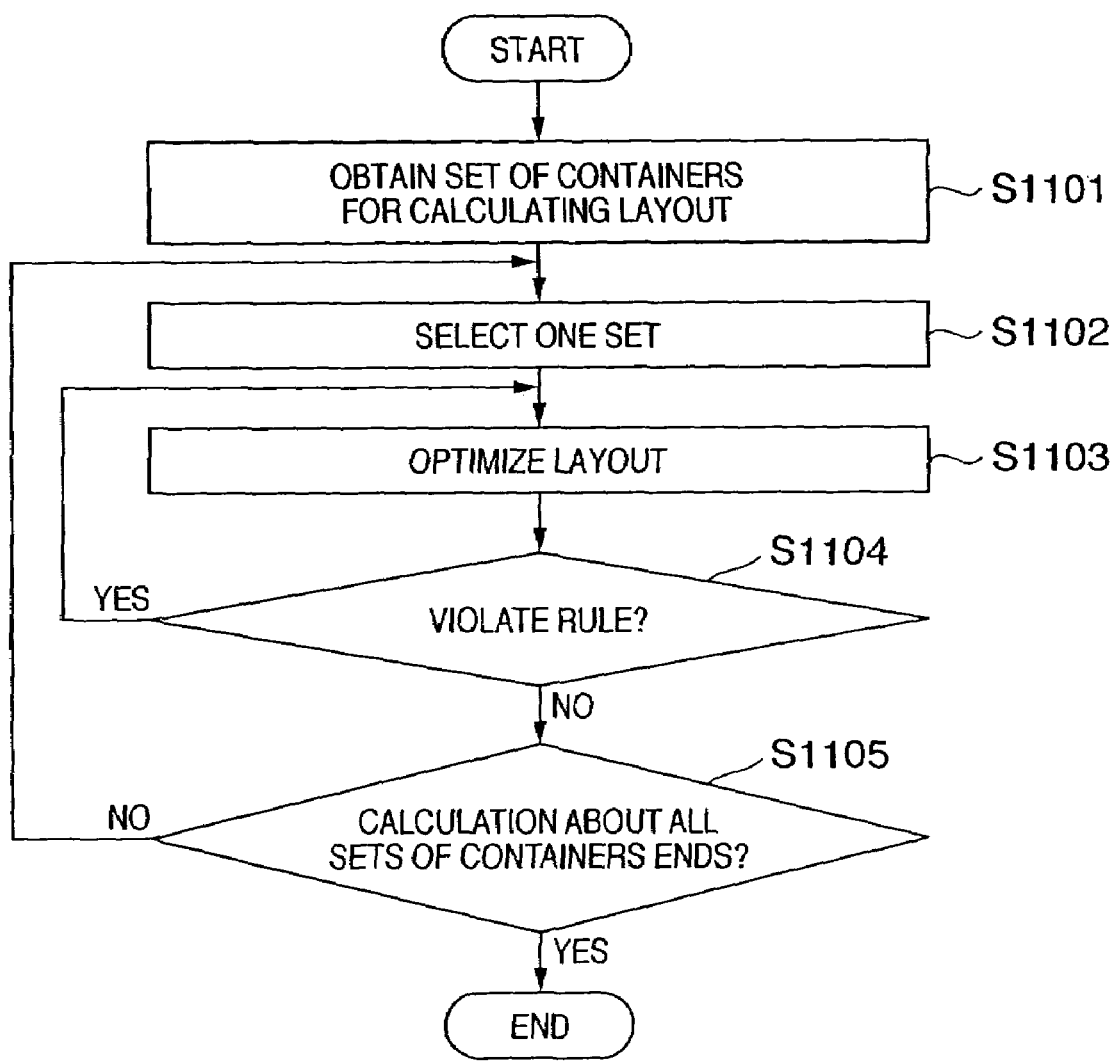
FIG. 11 is a flowchart showing a layout calculating way when the priority order for the layout according to an embodiment is not set.

Next, details of the calculation of a layout performed at the abovementioned step S1003 will be described. FIG. 11 is a flowchart showing a layout calculating way when the priority order for the layout according to the embodiment is not set. As this figure is a flowchart for illustrating only a layout calculating way, it corresponds to the layout calculating way in printing/previewing a record of a variable data print. For a plurality of records, the processes to be described below are repeated.

Figure 12:
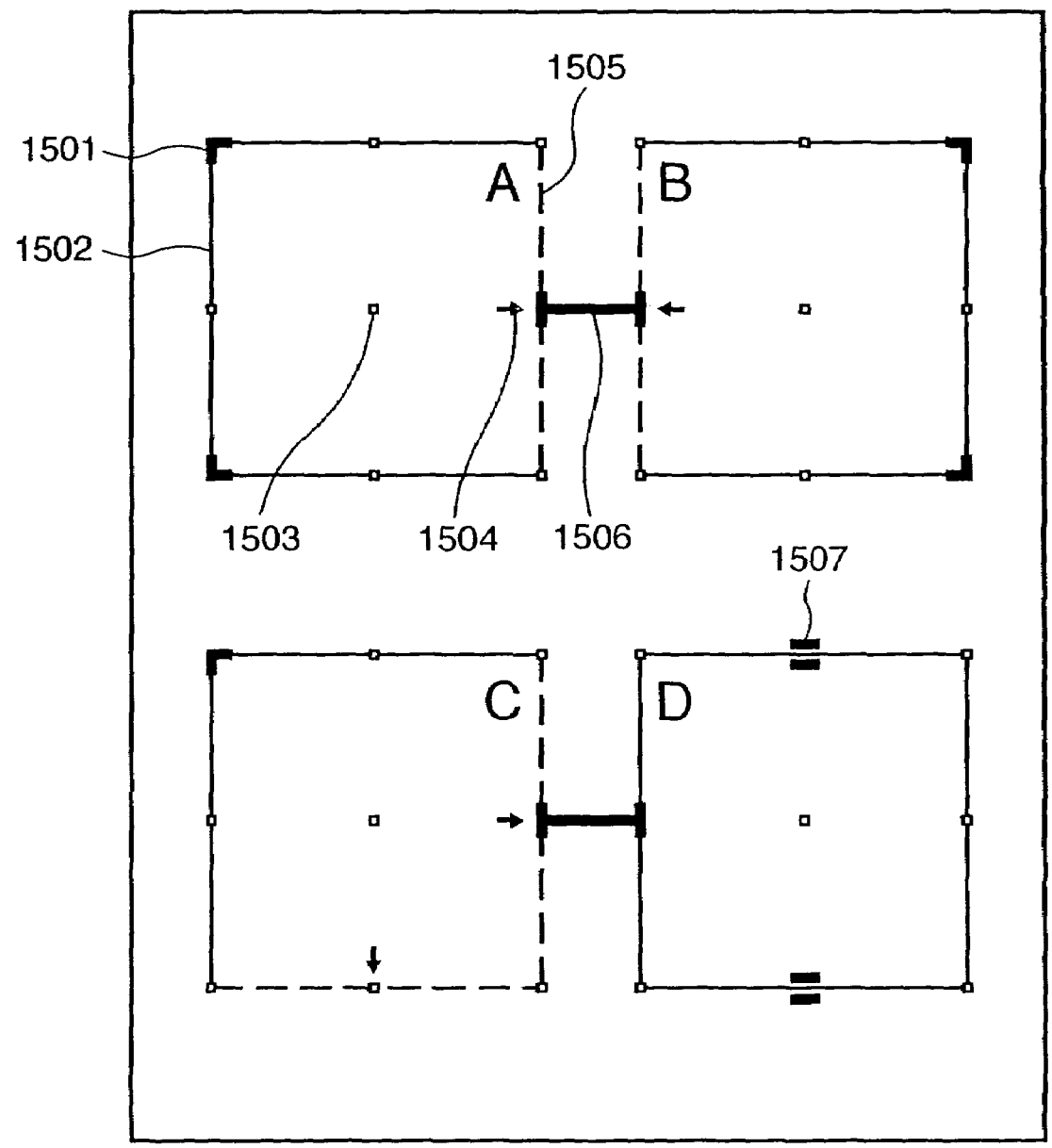
FIG. 12 is a diagram for illustrating a set of containers at calculating a layout of an embodiment of the present invention.

First, the layout editing application 121 obtains a set of containers for calculating a layout (step S1101). The layout calculation calculates the associated containers as a set. FIG. 12 is a diagram for illustrating a set of containers at calculating a layout of an embodiment of the present invention.

For example, with reference to FIG. 12, four containers are laid out on a page, with association being set for each container. In this case, container A and container B, and container C and container D are associated with each other by links. Therefore, the containers A and B are in a set 1, and the containers C and D are in a set 2. That is to say, a group of containers connected by link is specified as a set. As mentioned above, the reference number 1501 denotes an anchor, 1502 denotes a fixed edge, 1503 denotes a controller, 1504 denotes an arrow indicating the direction, in which a flexible edge moves, 1505 denotes a flexible edge, 1506 denotes a link and 1507 denotes a slider.

Next, the layout editing application 121 selects a set from the sets of containers obtained at step S1101 for calculating a layout (step S1102). Then, it calculates a layout for a selected set of containers. First, for two containers (A, B), which is flexible elements included in the selected set of containers, the size of each container without restriction from the size of image or the amount of text of data to be inserted is calculated. Specifically, the layout editing application 121 determines whether the container A is a container for image data or for a container for text. This determination is performed on the basis of the attribute which is set for a container as mentioned above.

Next, the layout editing application 121 reads data inserted into the container A. When the container A is a container for image data, it calculates the size of the image data (the number of pixels for width and height, and resolution) without restricted by the container A. When the container A is a container for text, the application can calculate the amount of data to be inserted into the container A on the basis of the number of characters and the attributes of the characters such as a font type, a font size, character pitch and a line pitch specified as container attributes of the container A for the text data as well. In the case of the container for text, as the aspect ratio of the container A cannot be determined without considering restriction, the restriction will be taken into account.

In the example shown in FIG. 12, as anchors are set at the upper left and the lower left of the container A, the height (in a vertical direction) of the container A is fixed. Therefore, the layout editing application 121 determines whether the characters of calculated amount of data (the amount of text) can be inserted into the container A with the width (in a horizontal direction) set as a basic pattern for the container A or not. If it is determined that all the characters can be inserted, the container A does not change in size (width, height) set as a basic pattern. If it is determined that not all the characters can be inserted, the container A extends in the horizontal direction as the height is fixed by the anchor setting. The layout editing application 121 calculates the size of the container A by calculating the width of the container A for receiving the characters of calculated amount of data (calculation unit 3402).

Next, the layout editing application 121 optimizes the layout so that the size of the container to be laid out differs from the actual size of the contents as little as possible (S1103). The optimization of a layout is performed so that the size of contents to be inserted differs from the size of contents to be laid out as little as possible in a container which is associated to allow the size to be dynamically changed.

The layout editing application 121 obtains the size of a set of containers calculated at step S1102, i.e., the total size of the container A and the container B and the link 1506 (it is a fixed link here), and obtains the difference between the total size and the size of a set of the containers in the basic layout (In the example of FIG. 12, this corresponds to a distance between the anchor icons in the container A and the container B). If the width of the container A or the container B is calculated to be large at the previous step, the difference value occurs. The layout editing application 121 adjusts the layout by dividing the difference value equally among elements of a set of containers (adjustment unit 3403).

The layout editing application 121 optimizes the layout. If the layout violates the rule, the application calculates the layout again not to violate the rule (S1104). The rule described here is a limit set by a user in creating a layout, including a limit on the flexible area for the size or the location of the container. In the case of a flexible link, the limit includes a limit on the variation of length of the link. When the layout is calculated not to violate the rule, the layout for the set completes. The layout editing application 121 performs processes from step S1102 to S1104 on all the sets on the page and calculates the layout for the entire page (S1105).

Figure 13A:
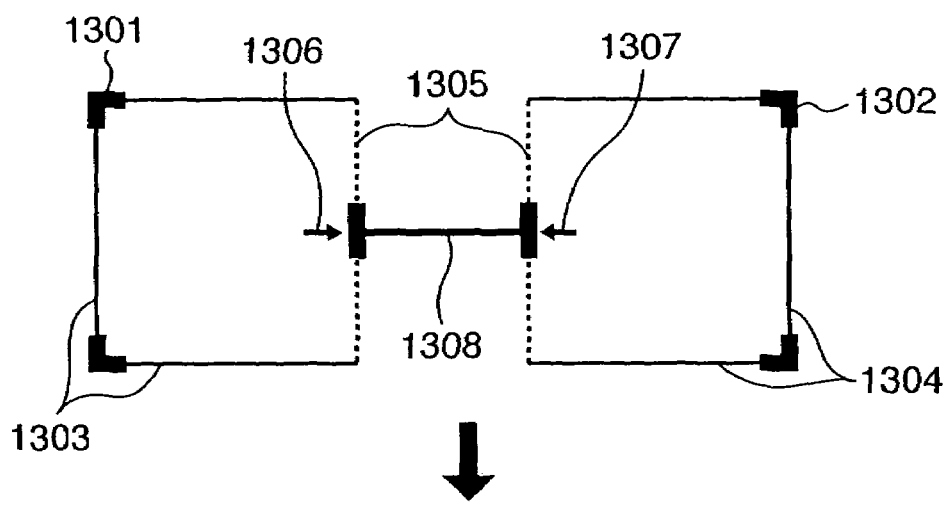
FIGS. 13A to 13C are diagrams showing an example of display of a UI when the priority order for a layout according to an embodiment is not set.
Figure 13B:
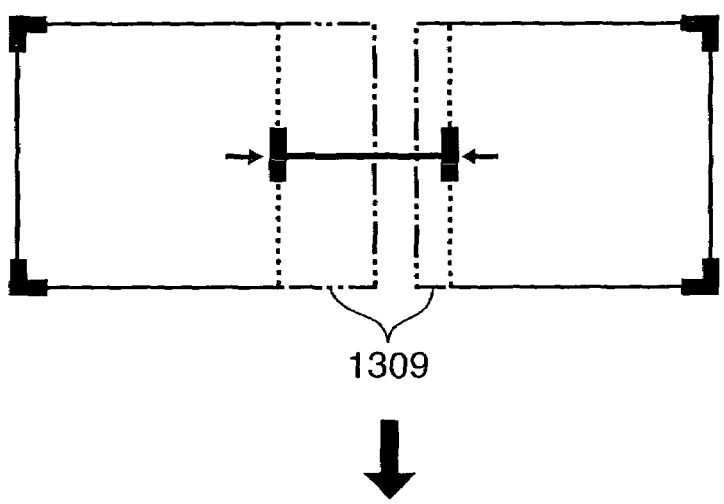
Figure 13C:
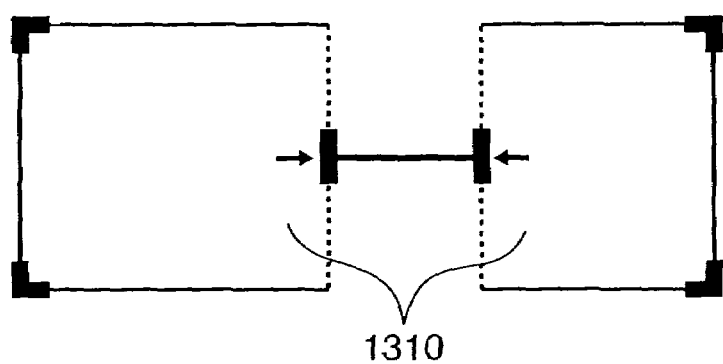

FIGS. 13A to 13C are diagrams showing an example of display of a UI when the priority order for a layout according to an embodiment is not set.

FIG. 13A represents the state where a certain record is inserted and the layout is determined. The reference numbers 1301 and 1302 denote anchors, 1303 and 1304 denote fixed edges, 1305 denotes a flexible edge, 1306 denotes an arrow indicating a direction, in which a flexible edge moves and 1308 denotes a link, respectively. In this state, a record is changed and contents with different sizes are inserted.

FIG. 13B represents a size of the new contents added to the state of FIG. 13A. The reference number 1309 denotes the sizes of contents inserted into respective containers. Then the layout is calculated. FIG. 13C represents the result of the layout calculation. The size of each container after the calculation is calculated so as to have the same difference as that for the size of the actual contents to be inserted and so as not to violate the abovementioned rule. As shown in FIG. 13C, the contents size to be inserted as shown in FIG. 13B (1309) and the contents size after the calculation (1310) have the same difference respectively.

Next, an effect of a flexible link when the data to be inserted into a container is an image will be described with reference to FIGS. 14 and 15.

[Setting of a Link with a Flexible Length]

FIG. 14 is a diagram showing an example of display of a user interface when a container is located according to a flexible link. Similar to FIG. 6, FIG. 14 includes an application window 301 and a tool bar 303. In the state of FIG. 14, a container 1203 and a container 1204 are on the document template 309. Each container includes an anchor icon 1201, an edge 1205 fixed to the anchor icon 1202 and an edge 1206. A flexible size sized link 1209 is present between the containers 1203 and 1204, connecting the container 1203 and the container 1204. As a link is set between the container 1203 and the container 1204, a right edge 1207 and a left edge 1208 of the respective containers are represented by dotted lines. Thus, an indicator 1210 and an indicator 1211 are shown in respective containers, indicating the edge 1207 and the edge 1208 are flexible, respectively.

Figure 15:
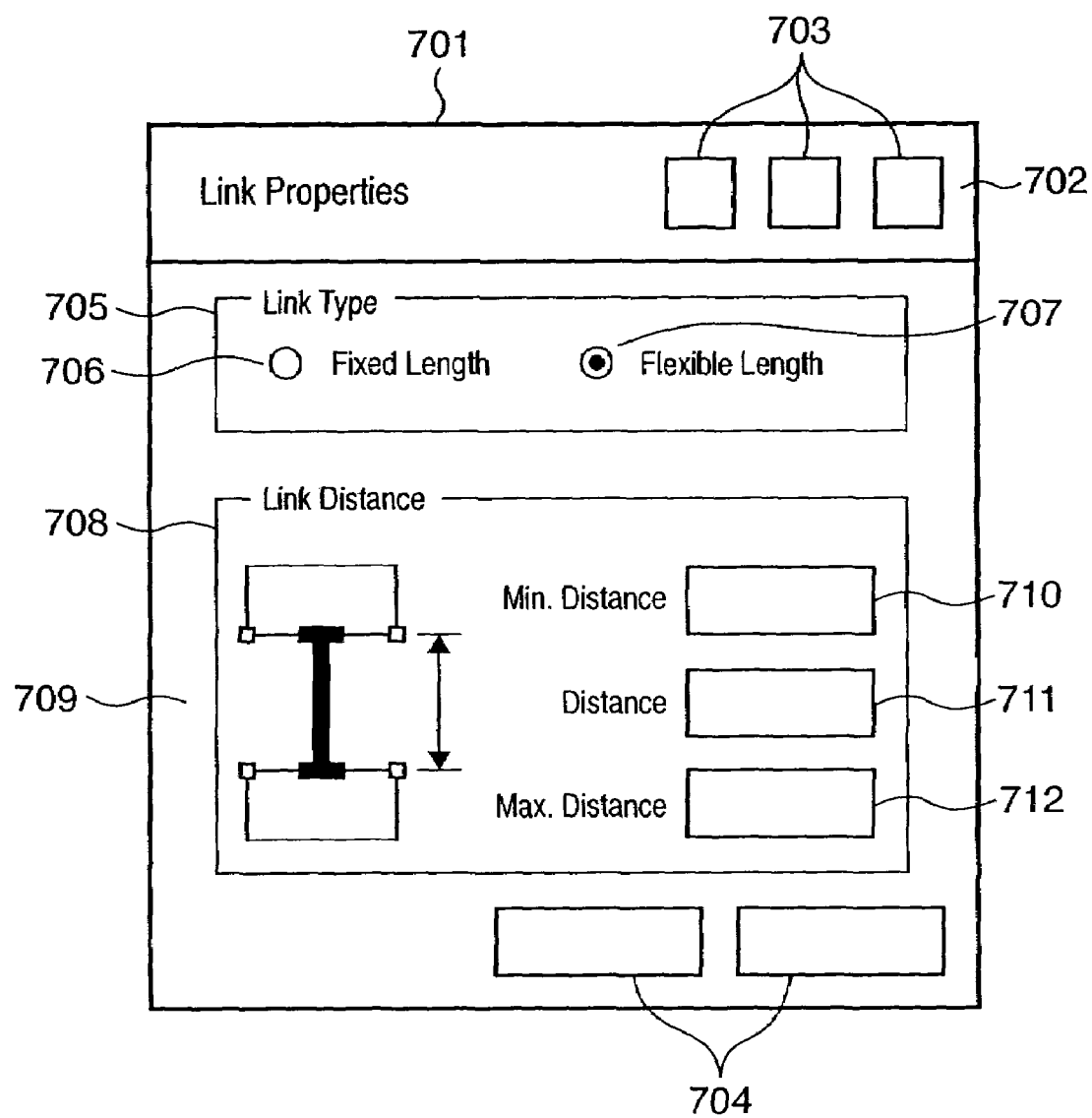
FIG. 15 is a diagram showing a dialog window for setting a link according to an embodiment.

FIG. 15 is a diagram showing a dialog window for setting a link according to an embodiment. FIG. 15 is a user interface screen in a link setting means, which is a characteristic configuration of the present invention, and an example of a dialog window 701 for setting information on the link 1209. The dialog includes a title bar 702, a tool button 703, a button for opening and closing the dialog window 704 and an area 709 for setting various types of information.

In the dialog window, the link type can be alternatively selected between a link with a flexible length (707) and a link with a fixed length (706). If the link type is flexible, the minimum value for the length of the link (Min.Distance710), the maximum value (Max.Distance712) and the reference value (Distance711) can be set.

The dialog 701 shown in FIG. 15 is displayed when a link between two containers are set by a setting operation of the link described in FIGS. 8 and 9A to 9C, for example, and the set link is selected with an operation such as clicking the mouse button on it. Alternatively, the dialog window 701 with respect to the link may be adapted to automatically appear just after setting of a link. The reference value 711 between respective containers is a length of the link used when the size of each container does not change as data is inserted.

Figure 16:
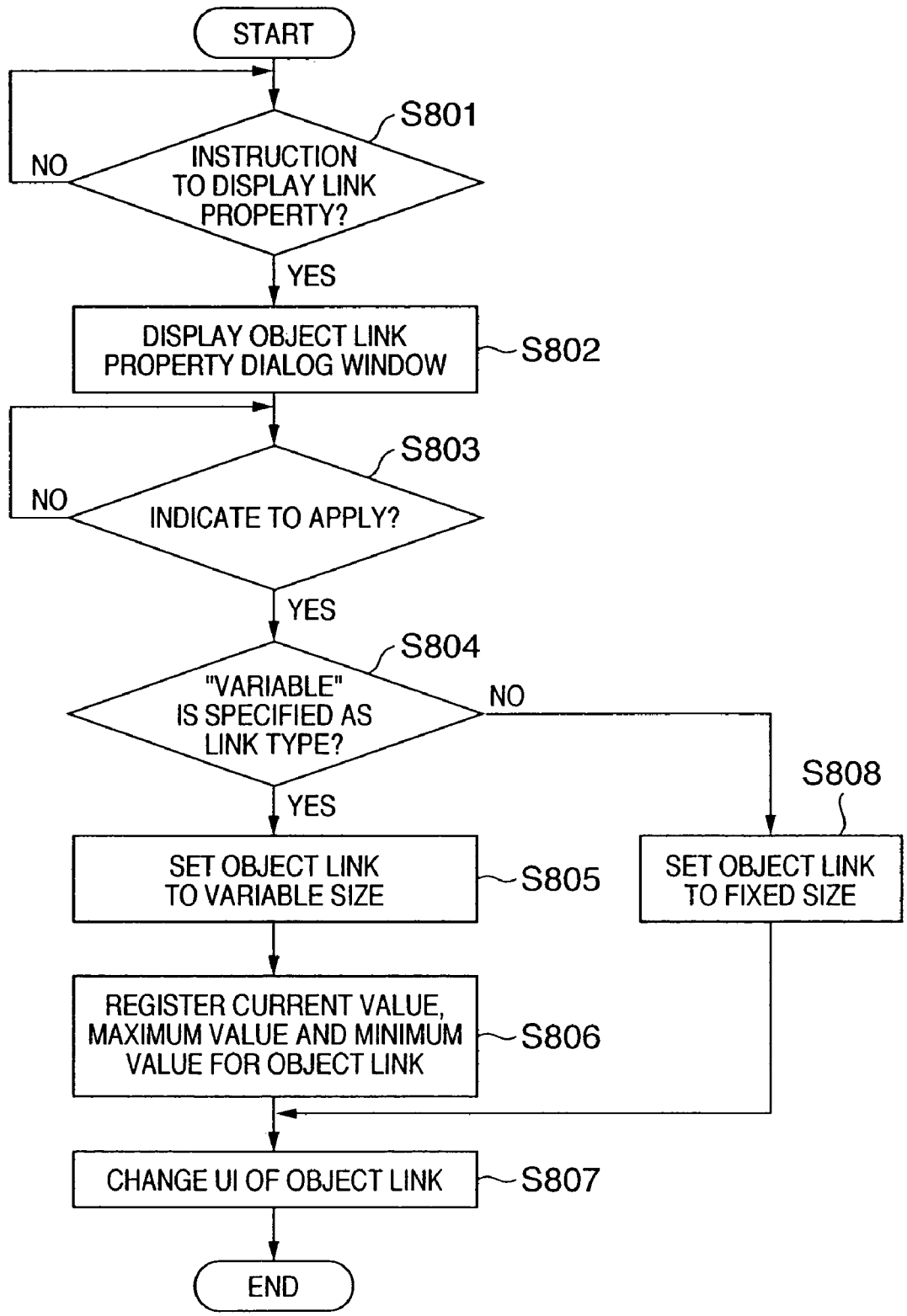
FIG. 16 is a flowchart for illustrating a processing procedure for setting a flexible link via a user interface 103 of an embodiment.

FIG. 16 is a flowchart for illustrating a processing procedure for setting a flexible link by a user interface 103 of an embodiment. For example, if a link is made between the container A and the container B of FIG. 12 in the manner described in FIGS. 8 and 9A to 9C, a link with a fixed size is made first. Then the link is selected and the processes shown in FIG. 16 are performed on it, the link can be transited from the state of the fixed sized link 1506 (FIG. 12) to the state of the various sized link 1209 (FIG. 14).

When a desired link (for example, the link 1506) is made into the selected state with a mouse and a predetermined operation for displaying a link property is performed on the link, the user interface 103 of the layout editing application 121 recognizes it as an input of an instruction to display the link property (step S801). When the user interface 103 recognizes the instruction to display the link property, the property dialog window 701 (FIG. 15) corresponding to the link in the selected state (hereinafter referred to as "object link") is displayed. Then, the user interface 103 displays the link property (step S802). A link can be selected by any operation such as the right click on the mouse or an operation of a specific key on a keyboard, as in setting a basic pattern of a container.

On the dialog window 701 displayed at step S802, the current state of the selected link is displayed. In the embodiment, as the link 1506 is selected, the link size is fixed at this stage and Fixed Length 706 indicating a fixed length is selected in Link Type 705.

In order to change a link from a fixed size to a flexible size in the dialog window 701, Flexible Length 707 for setting the link size to flexible in Link Type 705. This enables Max.Distance712, Min.Distance710 and Distance711 located in Link Distance 708, allowing a user to set numerical values. In order to set a flexible size for the link, the user sets the maximum value of the length of the link to Max.Distance712, the minimum value to Min.Distance710 and the current value to Distance711.

After the setting, the user indicates to apply the setting with a general dialog window opening/closing button 704. When the user interface 103 detects this indication, it proceeds from step S803 to step S804 to make the object link reflect the abovementioned setting state.

That is to say, the layout editing application 121 first determines whether the object link has a fixed size or a variable size at step S804. If a fixed size is specified, it proceeds to step S808, where the object link is set to "fixed size" and a display state of the object link is changed to "solid line" representing that it is a "fixed link" at step S807.

On the other hand, if a variable size is specified at step S804, the layout editing application 121 proceeds to step S805, where the application sets the object link to "variable size". At step S806, the application registers the current value (reference value), the maximum value and the minimum value of the object link set through the abovementioned dialog window 701. At step S807, a display state of the object link is changed to "dotted line" representing that it is a "flexible link". As a result, UI display of the link changes to a state shown by the link 1209 in FIG. 14. The setting information on the abovementioned dialog window 701 is stored in memory.

For the current value to be set for Distance711, a distance between containers located in the current layout may be automatically input as a default value.

Figure 17:
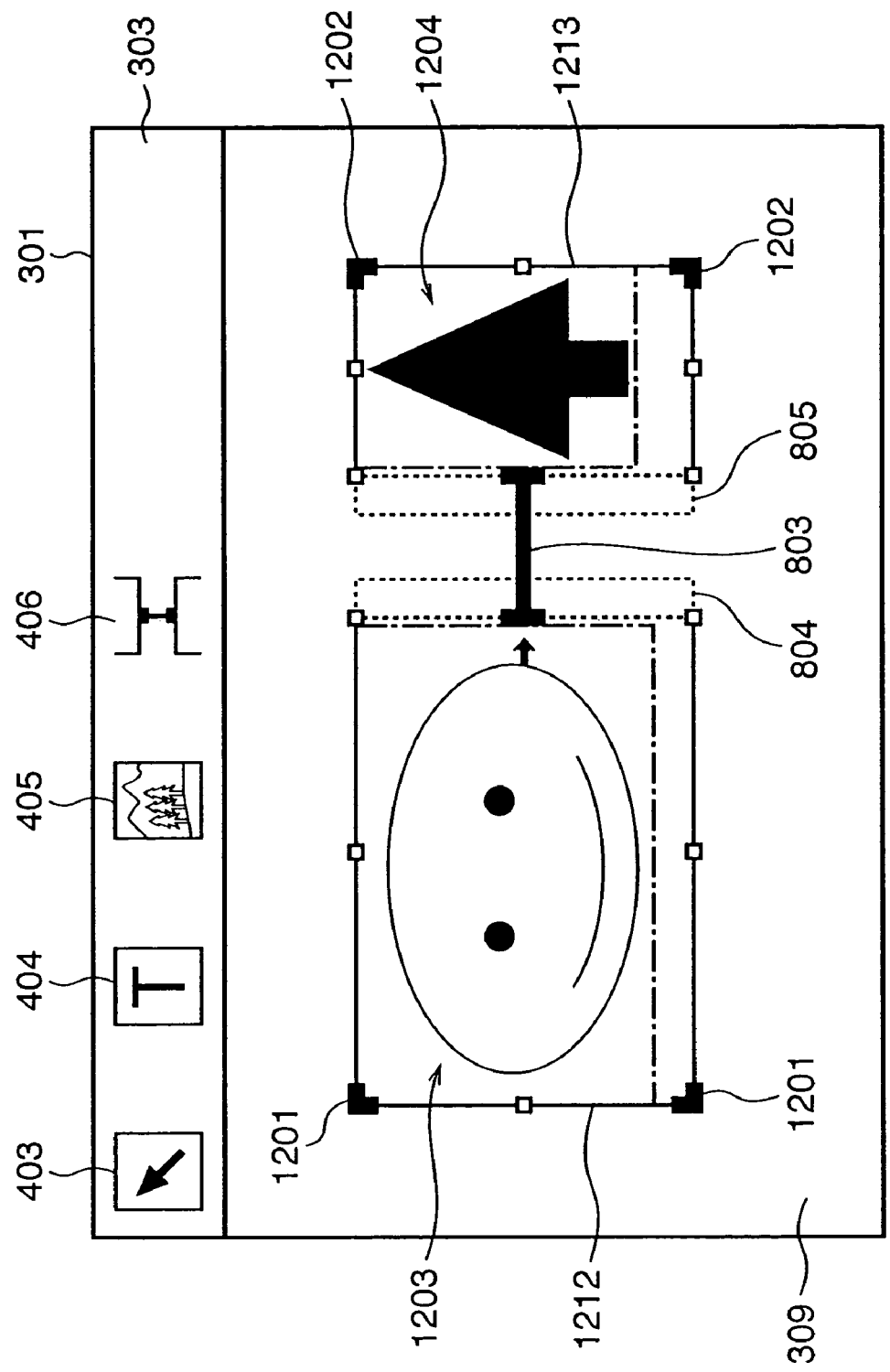
FIG. 17 is a diagram showing a layout resulting from a use of a fixed sized link.

FIG. 17 is a diagram showing a layout resulting from a use of a fixed sized link. The layout calculation is performed according to the abovementioned procedure. For example, image data with different sizes are considered to be inserted in the container 1203 and the container 1204, respectively, in FIG. 14. In this case, each container considers the size of data optimal. The container 1203 is going to expand rightward to fit in a frame 804 in order to be an inserted image size (optimal container size), and the container 1204 is going to expand leftward to fit in a frame 805 in order to be an inserted image size (optimal container size).

The container 1203 and the container 1204 cannot move their left edge 1212 and the right edge 1213 due to the anchor 1201 and the anchor 1202, respectively. In order to change the size as mentioned above, the distance between the containers needs to be shorter. As the fixed sized link 803 is set between the containers, however, and the length is kept while the layout is calculated, the sizes of the container 1203 and the container 1204 will be changed.

As a result, the container 1203 and the container 1204 are unable to reserve an optimal size for an aspect ratio of the data. Finally, the containers become smaller than the optimal sizes (frame 804, frame 805) as shown in FIG. 17. That is to say, as the size of the link 803 is fixed, the container 801 and the container 802 are unable to achieve their optimal sizes (In FIG. 17, a area defined by chained lines in each container is an aspect ratio for the data).

Figure 18:
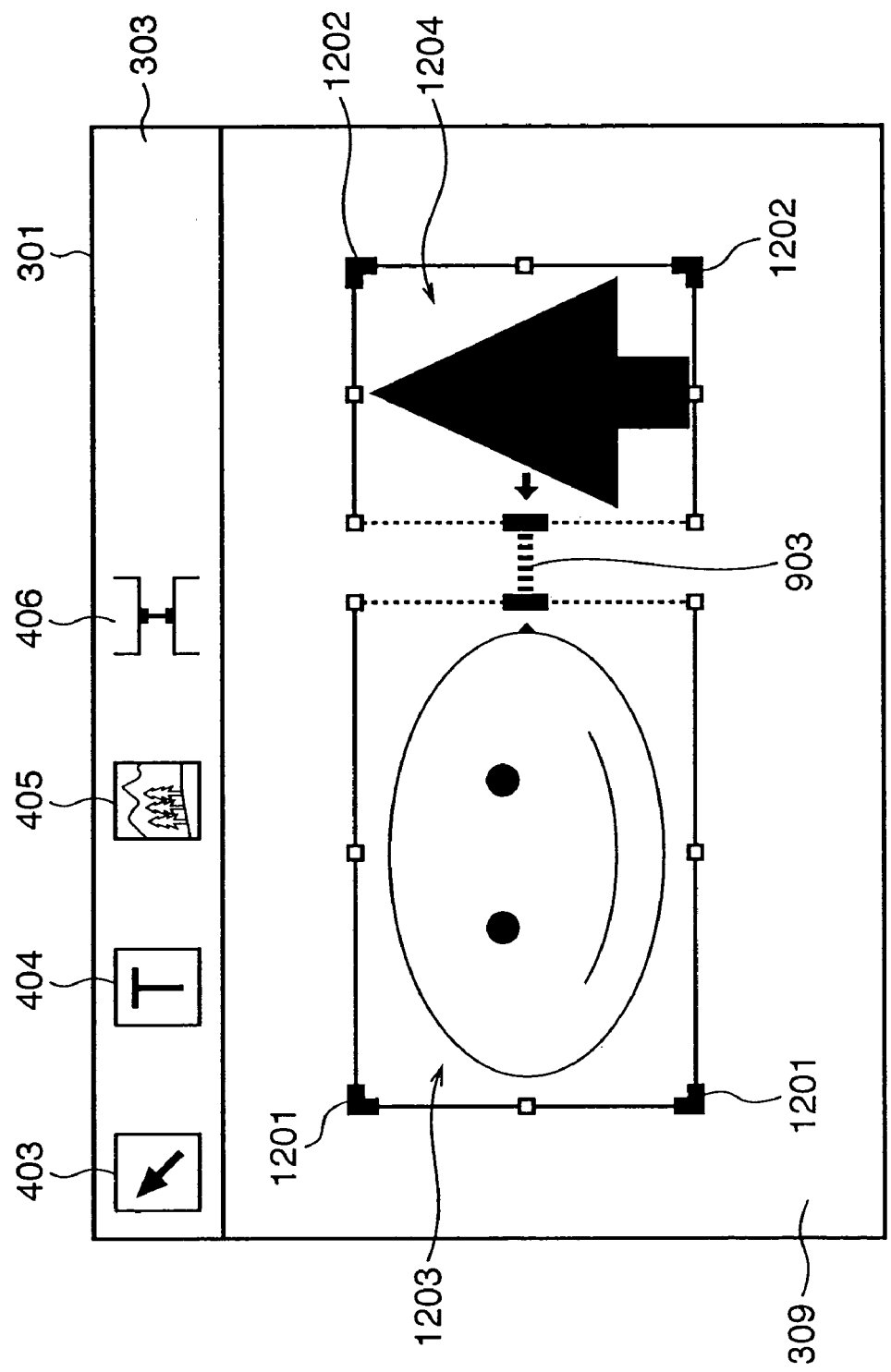
FIG. 18 is a diagram showing a layout resulting from a use of a flexible sized link.

On the other hand, FIG. 18 is showing a layout resulting from a use of a flexible sized link. That is to say, the figure shows the case where the link is set to flexible size in the same state as that of FIG. 17. In this case, a flexible sized link is set between the container 1203 and the container 1204 as shown in the figure in the above example. Therefore, when the sizes of the container 1203 and the container 1204 are changed, the sizes of the container 1203 and the container 1204 can be increased than those in the example of FIG. 17 by reducing the link size.

As a result, an optimal size for the data size to be inserted can be achieved, or frames of the containers can be set closer to the inserted data size (optimal size). FIG. 18 shows the result. As a result of the layout calculation, the flexible link 1209 will be in the size state as shown by the flexible link 903. In this case, the container 1203 and the container 1204 are in optimal sizes (sizes corresponding to sizes of data), respectively.

<Outline of Layout Processing on a Sub-Template>

Figure 19:
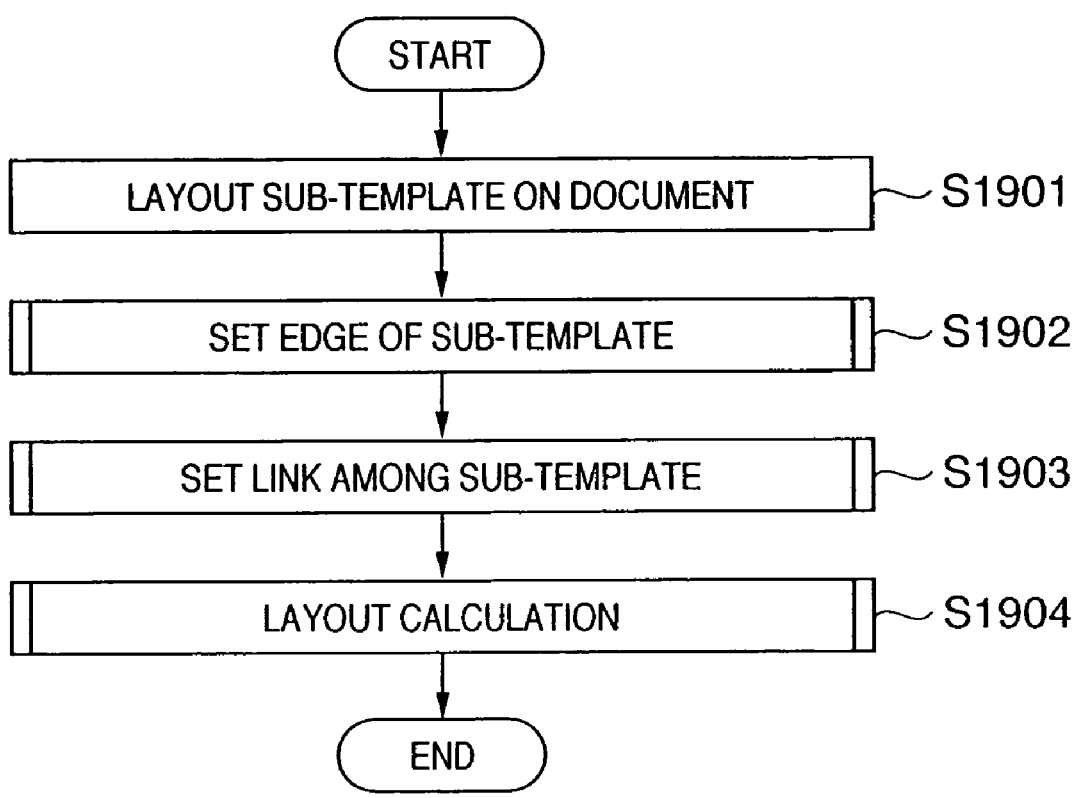
FIG. 19 is a flowchart for illustrating the entire layout processing on a sub-template according to an embodiment of the present invention.

FIG. 19 is a flowchart for illustrating the entire layout processing on a sub-template according to an embodiment of the present invention. First, a sub-template is laid out on a document (step S1901). A layout defined with a plurality of containers for contents to be inserted is separately defined as a sub-template. That is to say, the sub-template itself has a sub basic layout, which has data areas (container) for data of respective records to be inserted. The data areas are linked in the sub basic layout to indicate that the data areas are associated with each other. At step S1901, the sub-template is laid out by any number at any location on the document according to a user's instruction. A container can be laid out on a document as well as a sub-template. Thus, a document template with a sub-template and a container mixed in it is possible.

Next, an "edge" is set so that a laid out sub-template can be dynamically changed (step S1902). The laid out sub-templates are associated with each other by link (step S1903). Processes at steps S1902 and S1903 will be described later in detail. For processes of steps S1902 and S1903, a process of step S1902 can be performed after a process of step S1903. Finally, layout calculation is performed and the process ends (step S1904).

<Detail of an Edge Setting Process (Step S1902) on a Sub-Template>

Figure 20:
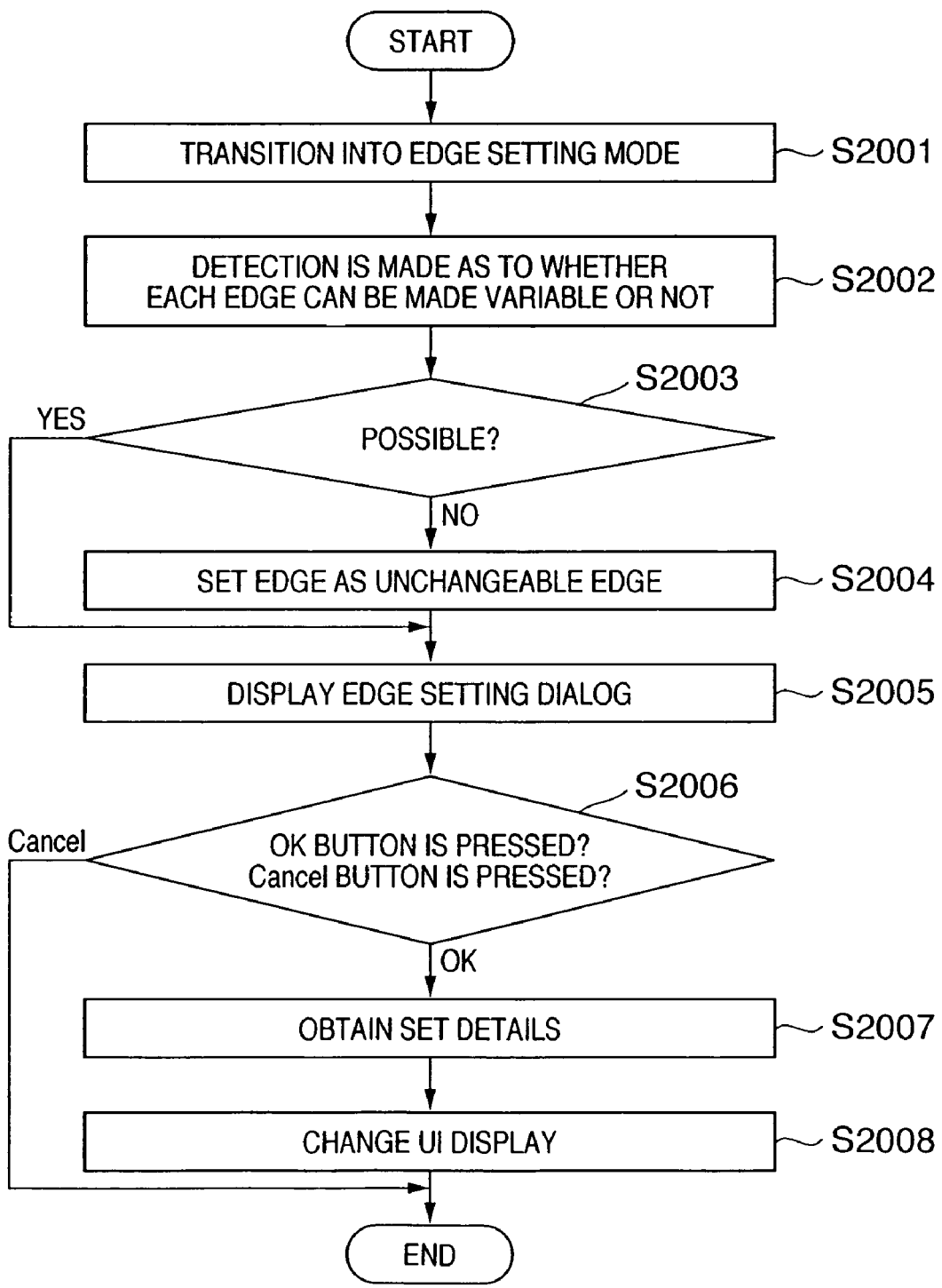
FIG. 20 is a flowchart for illustrating a sub-template setting process (step S1902) in the flowchart shown in FIG. 19 in detail.

FIG. 20 is a flowchart for illustrating a sub-template setting process (step S1902) in the flowchart shown in FIG. 19 in detail.

Figure 21A:
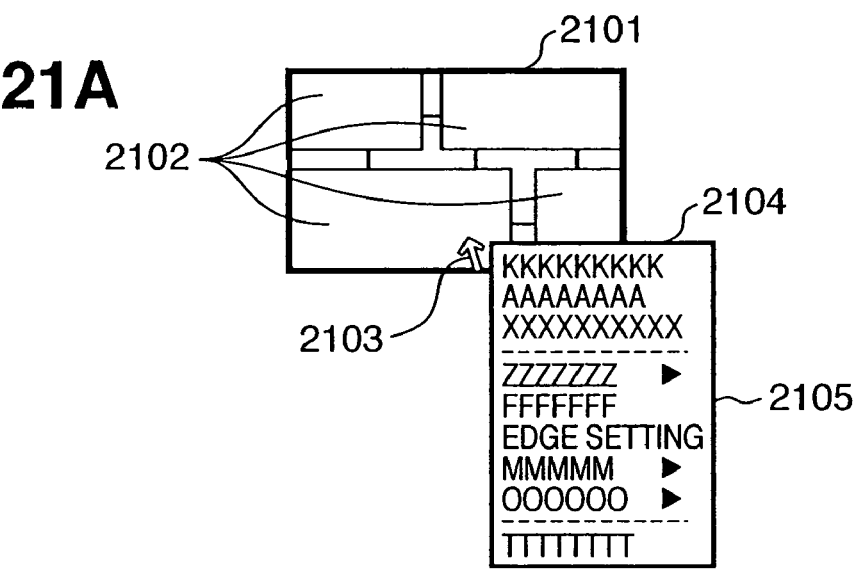
FIG. 21A is a diagram for outlining a way of transitioning a mode into the edge setting mode in step S2001 in the sub-template setting process.
Figure 21B:
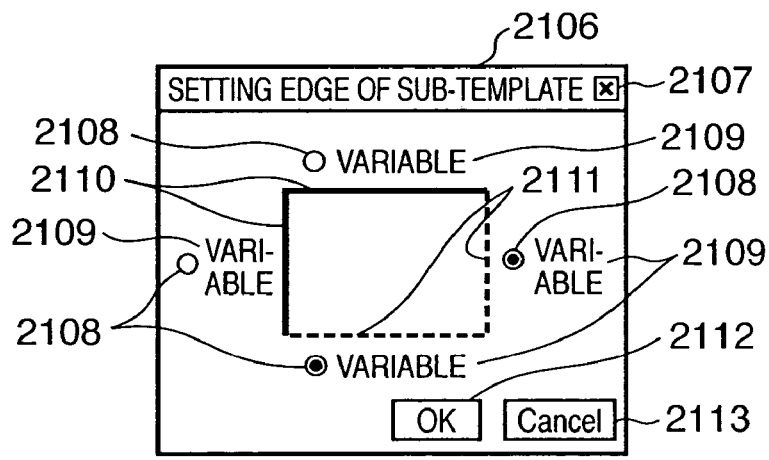
FIGS. 21B and 21C are diagrams showing examples of an edge setting dialog displayed at step S2005 in the flowchart shown in FIG. 20.
Figure 21C:
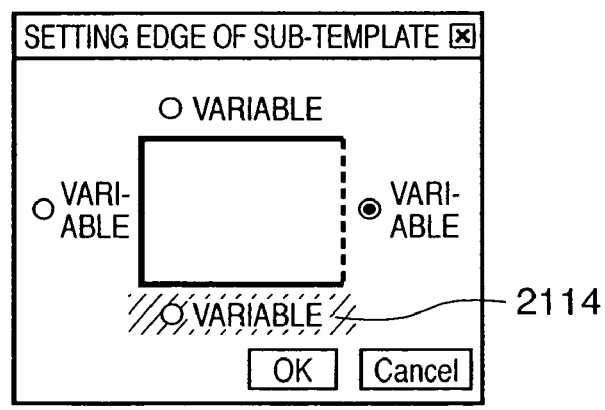

First, a mode is transitioned into an edge setting mode (step S2001). FIGS. 21A-21C are diagrams for outlining a way of transitioning a mode into the edge setting mode in step S2001 in the sub-template setting process. For example, as shown in FIG. 21A, a user can transition a mode into the edge setting mode by selecting an edge setting item 2105 in a pop up menu 2104 displayed on each sub-template with clicking a right button of a mouse 2103.

In FIG. 21A, the reference number 2102 denotes containers in a sub-template. The edge setting mode is a mode for determining an edge of the sub container 2102 between fixed/variable. The determination is performed via a setting dialog (setting unit 3404). That is to say, at step S2001, a series of work flow for setting and determining an edge via the edge setting dialog is considered as the edge setting mode.

Figure 22:
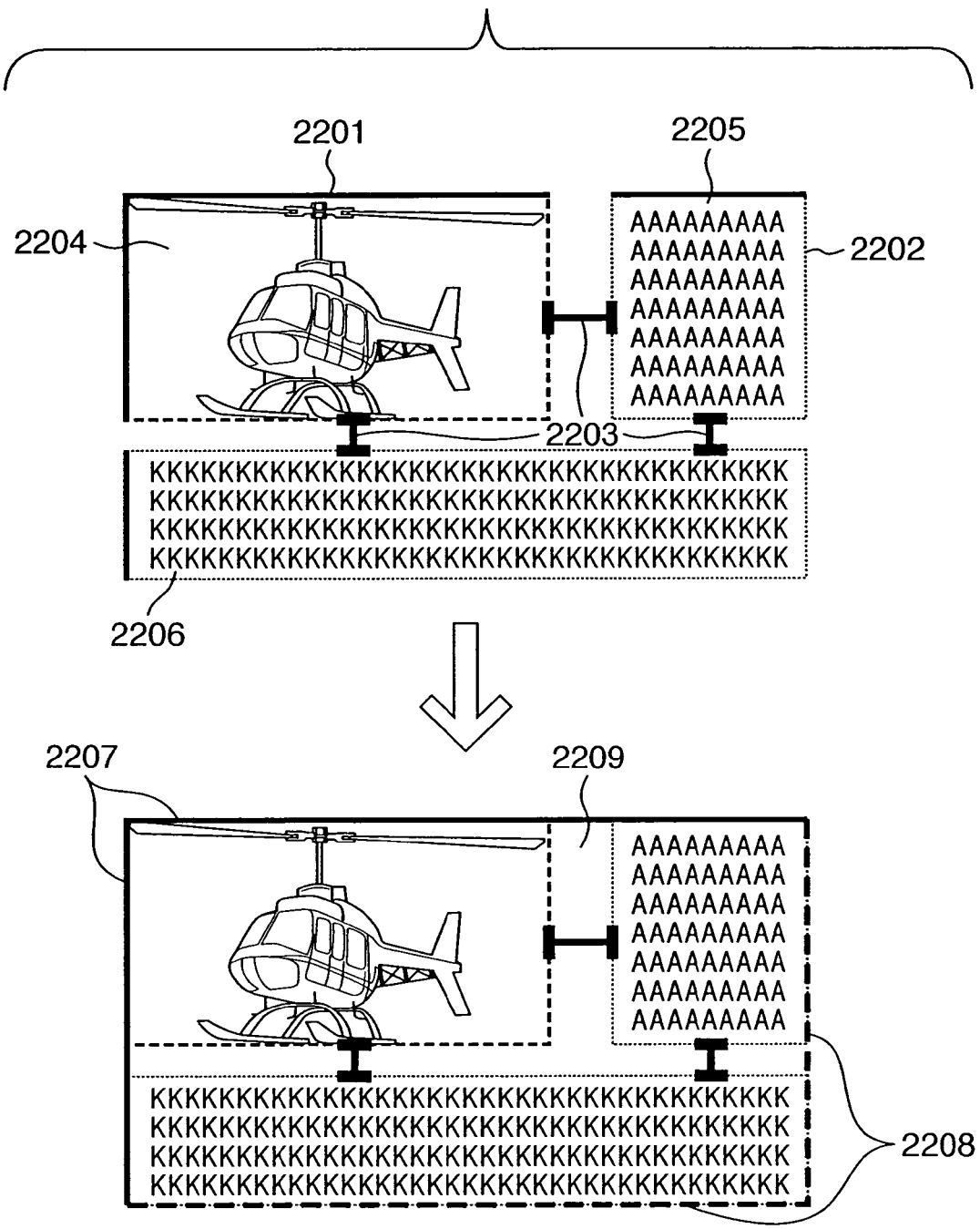
FIG. 22 is a diagram for illustrating a relationship between an edge state of a container in a sub-template and an edge state of a sub-template.
Figure 23:
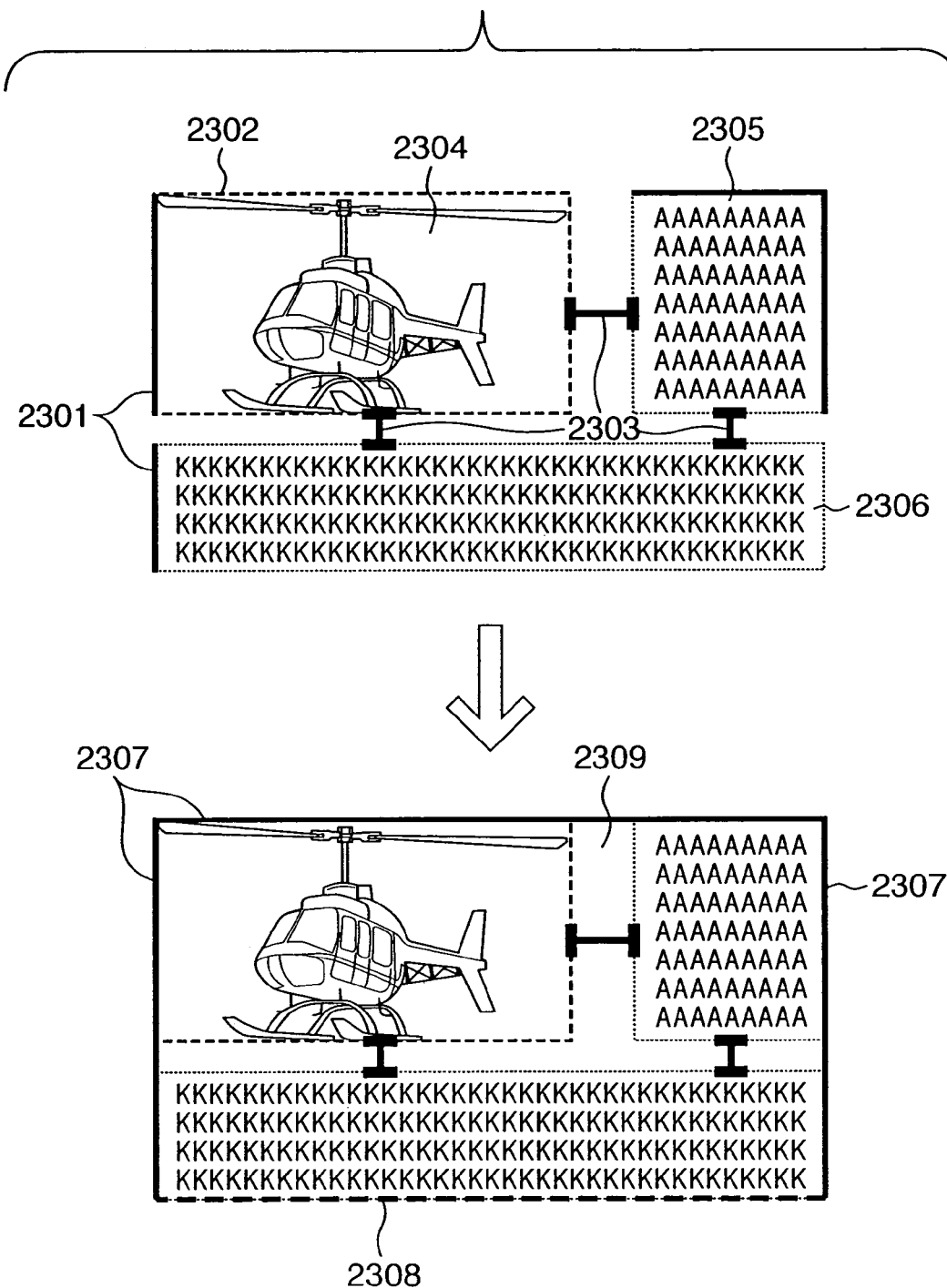
FIG. 23 is a diagram for illustrating a relationship between an edge state of a container in a sub-template and an edge state of a sub-template.

After a mode is transitioned into the edge setting mode at step S2001, detection is made as to whether each edge of the sub-template can be made variable or not (step S2002). The detection at step S2002 will be described with reference to diagrams. FIGS. 22 and 23 are diagrams for illustrating a relationship between an edge state of a container in a sub-template and an edge state of a sub-template.

In FIG. 22, three laid out containers 2204, 2205 and 2206 are defined and laid out with a fixed edge 2201 represented by solid lines and a variable edge 2202 represented by dotted lines. An edge of a sub-template 2209 is controlled by a state of each edge of containers (here, containers 2204, 2205, 2206), which are laid out in the sub-template 2209.

As mentioned above, an edge of an inside container circumscribing each edge of the sub-template is shared by the container and the sub-template: The top edge of the sub-template 2209 is shared by the top edges of a container 2204 and a container 2205, the bottom edge of the sub-template 2209 is shared by the bottom edges of a container 2206, the right edge of the sub-template 2209 is shared by the right edges of the container 2205 and the container 2206, the left edge of the sub container 2209 is shared by the left edges of the container 2204 and the container 2206.

If all the states of edges of containers inside a sub-template are fixed, edges of the sub-template are also determined as fixed. If the states of edges of containers inside a sub-template are a mix of fixed and variable, edges of the sub-template are determined fixed. If all the states of edges inside a sub-template are variable, edges of the sub-template can be set by a user selecting fixed or variable.

In the case shown in FIG. 22, based on the states of edges of containers inside the sub-template, the top and left edges of the sub-template 2209 are set as fixed edges 2207 represented by solid lines and the right and bottom edges of the sub-template 2209 are set as variable edges 2208 represented by dotted lines.

On the other hand, in FIG. 23, in contrast with the case shown in FIG. 22, the top edge of a container 2304 is a variable edge 2302 represented by dotted lines and the right edge of a container 2305 is a fixed edge 2301 represented by solid lines. Thus, the top edge of a sub-template 2309 is determined as a fixed edge 2307 as it is and the right edge is determined as a fixed edge 2307 allowing only a bottom edge (edge 2308) to be variable.

Detection is made as to whether a fixed edge of the sub-template can be made variable or not in the abovementioned manner to determine whether it is available or not (step S2003). If it is determined unavailable (No), the edge is determined as fixed and set as an unchangeable edge (step S2004). If it is determined available at step S2003 (Yes), or after the edge is set at step S2004, the edge setting dialog is displayed (step S2005: display unit 3405).

FIGS. 21B and C are diagrams showing examples of the edge setting dialog displayed at step S2005 in the flowchart shown in FIG. 20. In FIG. 21B, the reference number 2106 denotes an edge setting dialog. The reference number 2107 denotes a closing button of a dialog, 2108 denotes radio buttons switching between fixed and variable for the edges. In FIG. 21B, a cleared radio button indicates that it is in a check off state and a checked radio button indicates that it is in a check on state.

In FIG. 21B, the reference number 2109 is a control indicating that it becomes variable when the radio button 2108 is in a check on state. The reference numbers 2110 and 2111 are UIs for indicating the state to which the edge of the sub-template is set. That is to say, the edge 2110 shown by solid lines indicates that it is in a fixed state, and the edge 2111 shown by dotted lines indicates that it is in a variable state. The reference number 2112 denotes an OK button for applying a state set, and 2113 denotes a cancel button for terminating the process without setting an edge.

The reference number 2114 in the edge setting dialog 2106 shown in FIG. 21C shows an exemplary UI which grays out an edge determined as impossible to be variable at an edge detecting step (step S2002) for disabling the edge to be edited.

Next, an edge of the sub-template is set via the edge setting dialog described with reference to FIGS. 21A-21C and the OK button 2110 or the cancel button 2113 is pressed (step S2005). If the OK button 2113 is pressed, the set details are obtained (step S2007). Then, the UI of the sub-template is changed according to the set details (step S2008) and the edge setting process ends. If the cancel button is pressed at the edge setting dialog (if it is Cancel at step S2006), the edge setting process ends as it is.

<Details of a Link Setting Process (Step S1903) on a Sub-Template>

Figure 24:
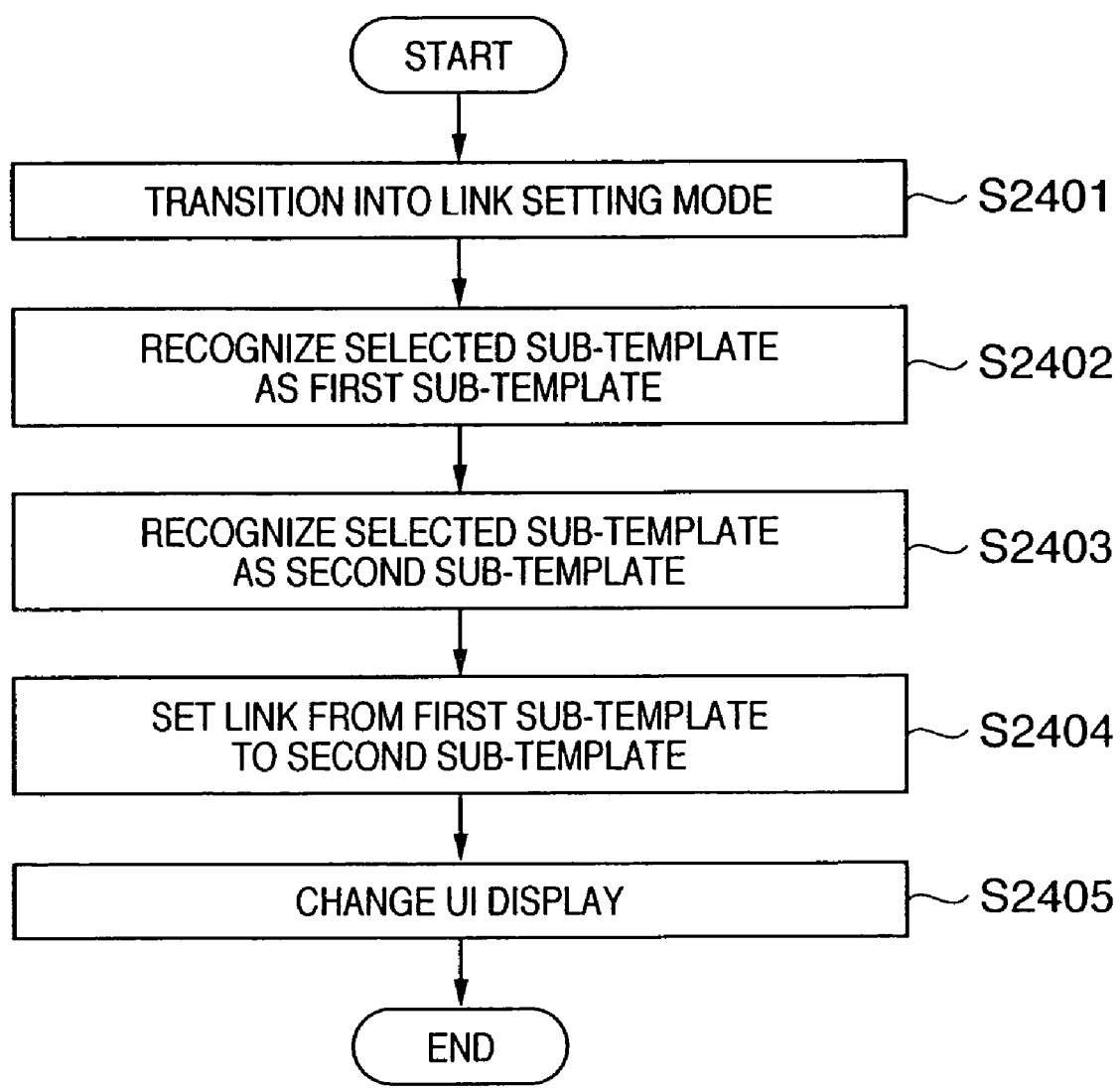
FIG. 24 is a flowchart for illustrating a link setting process (step S1903) between sub-templates in the flowchart shown in FIG. 19 in detail.

FIG. 24 is a flowchart for illustrating a link setting process (step S1903) between sub-templates in the flowchart shown in FIG. 19 in detail. A link is set between sub-templates in the same processing flow as that performed between containers.

First, a mode is transitioned into a link setting mode (S2401). A mode is transitioned into the link setting mode by selecting a link tool with a tool button (a button 406 in FIG. 4) of an automatic layout system as the same manner as in setting a link between containers. After a mode is transitioned into the link setting mode, a first sub-template for setting a link is selected by clicking a button on a mouse. The selected sub-template is recognized as the first sub-template for setting a link (step S2402).

Figure 25:
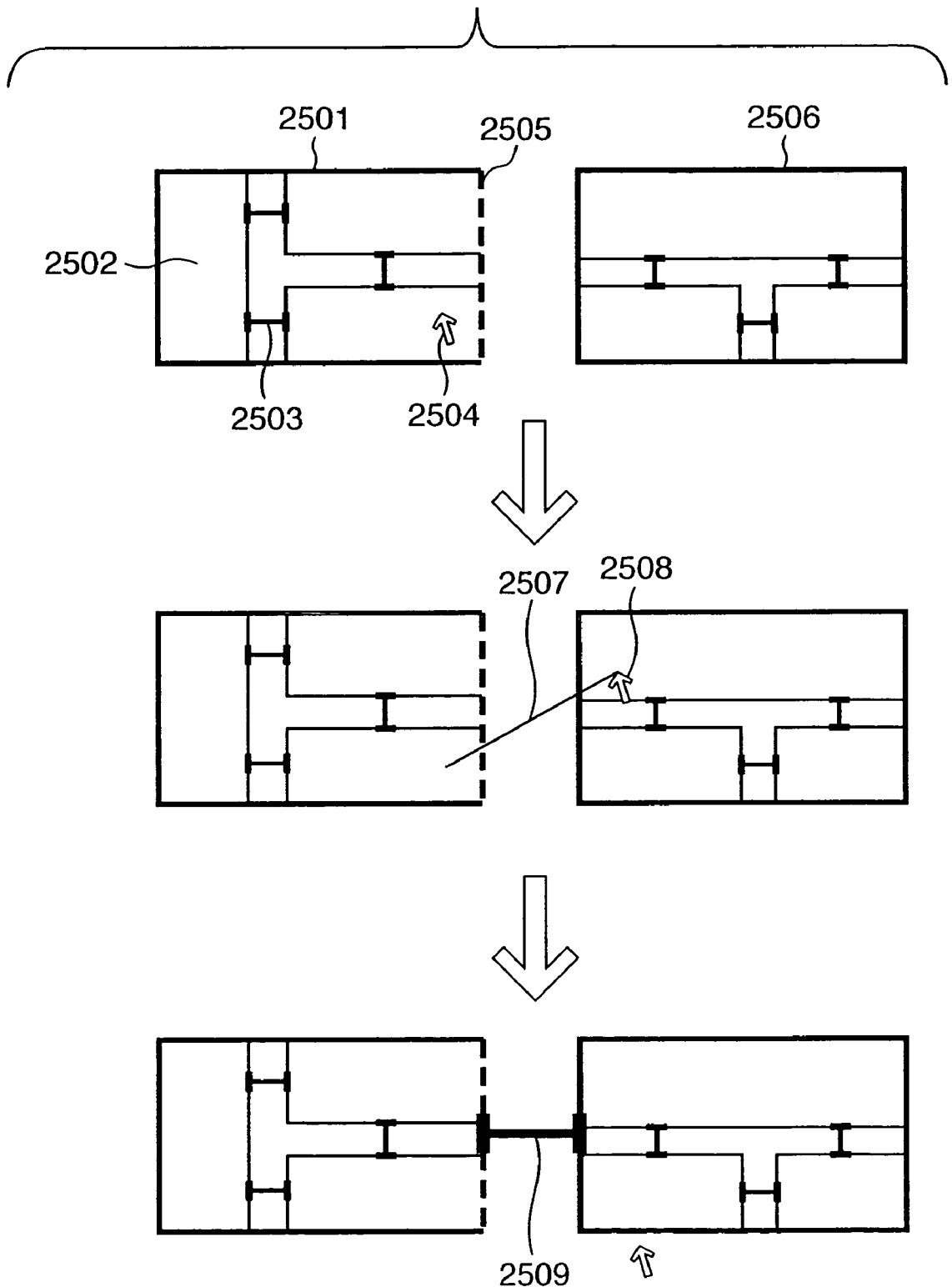
FIG. 25 is a diagram for showing an exemplary UI in a link setting process between sub-templates.

FIG. 25 is a diagram for showing an exemplary UI in a link setting process between sub-templates. In FIG. 25, the reference numbers 2501 and 2506 denote sub-templates, 2502 denotes a container laid out in the sub-template, 2503 denotes a link set between containers in the sub-template. The reference number 2504 denotes a mouse pointer and 2505 denotes a variable edge of a sub-template.

It is assumed that a mouse button is clicked on the sub-template 2501 and the sub-template is recognized as the first sub-template for setting a link. A mouse pointer 2504 is moved (to the location of the mouse pointer 2508) and the sub-template on which the mouse button was clicked is recognized as a second sub-template for setting a link (step S2403). In moving the mouse pointer 2308, it is more preferable to display a line (cursor path) 2507 from where the mouse button was clicked on the first sub-template (from the location of the mouse pointer 2504) for showing the sub-template from which the link is set.

When the second sub-template is selected at step S2403, a link is set from the first sub-template to the second sub-template-concurrently (step S2404). Finally, the set link UI 2309 is displayed and the process ends (step S2405).

<Details of a Layout Calculation Process on a Sub-Template (Step S1904: Basic Layout Determination Unit 3406)>

Figure 26:
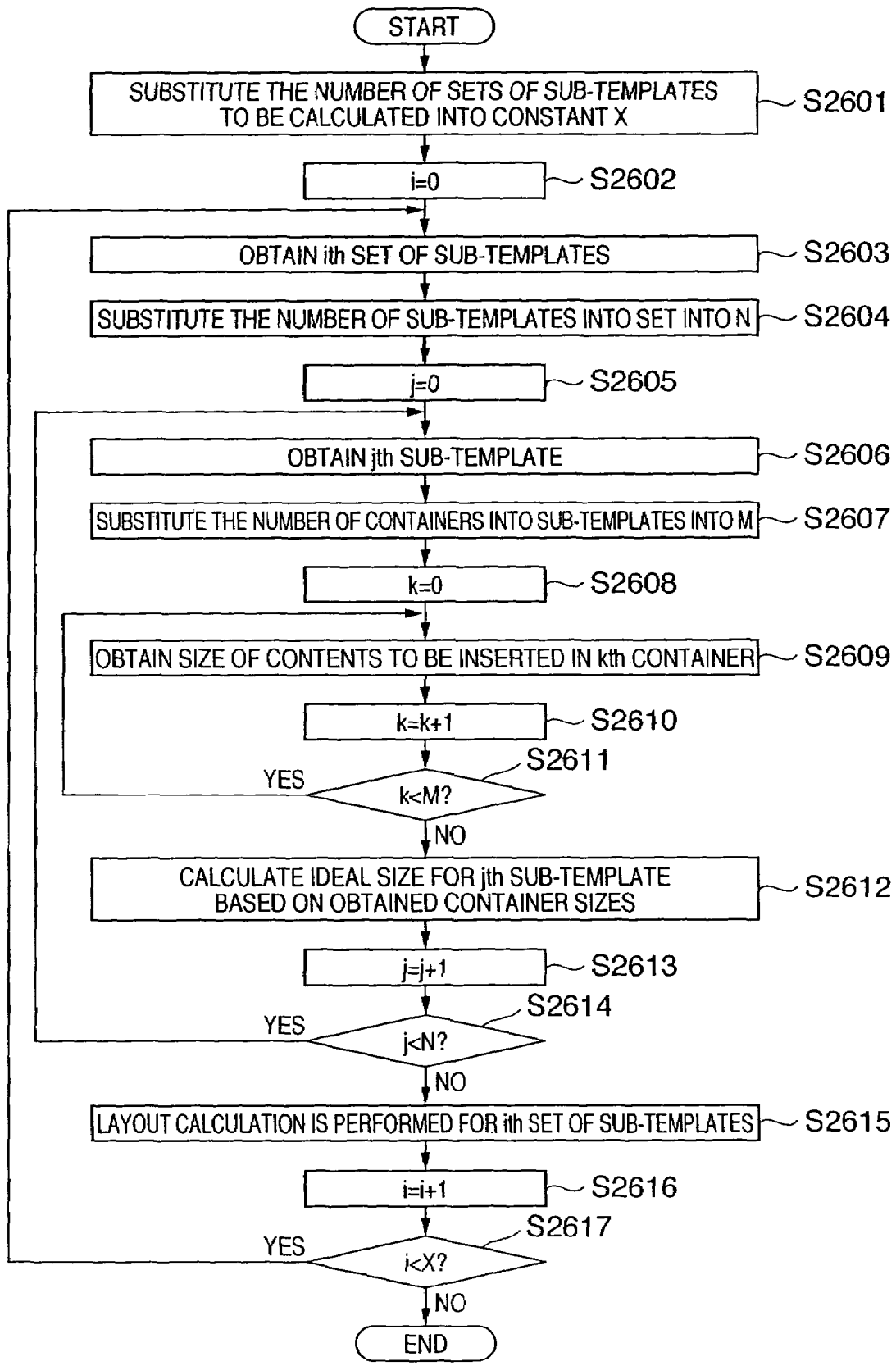
FIG. 26 is a flowchart for illustrating a sub-template calculating process (step S1904) in the flowchart shown in FIG. 19 in detail.

FIG. 26 is a flowchart for illustrating a sub-template calculating process (step S1904) in the flowchart shown in FIG. 19 in detail. FIGS. 29A, 29B, 30, 31 and 32 are diagrams showing examples of layout calculation. The layout calculation process at step S1904 will be described in detail below.

First, the entire layout calculating process will be described. First, the number of sets of sub-templates to be calculated is substituted into a constant X (step S2601). This process is the same as that for detecting sets of containers which is performed at the abovementioned layout calculation of the container. Among a plurality of sub-templates laid out on a document, sub-templates associated with each other by links are recognized as the same set. As a result, the sub-templates laid out on a document are divided into some sets.

Figure 29A:
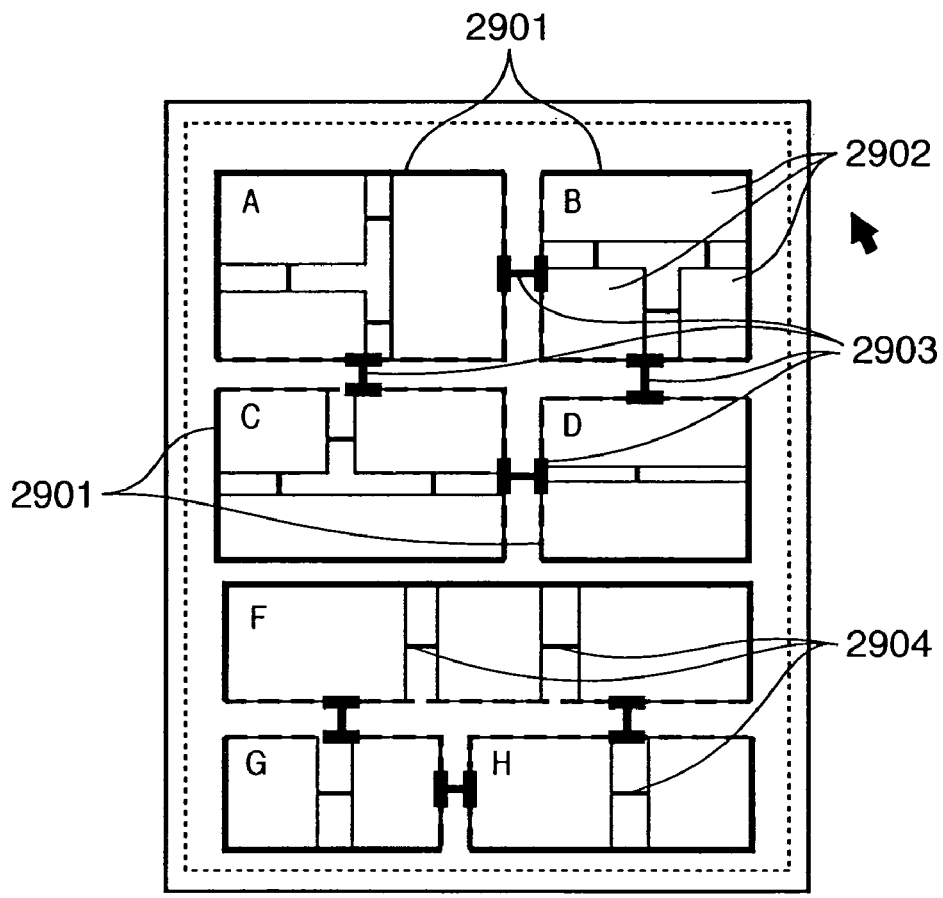
FIGS. 29A and 29B are diagrams showing an example of layout calculation.

For example, in FIG. 29A, the sub-templates 2901 are associated with each other by a link 2903. In FIG. 29A, the reference number 2902 denotes containers in a sub-template, 2904 denotes links between containers in the sub-template. In FIG. 20A, sub-templates A, B, C and D are associated with each other by links, and sub-templates F, G and H are associated with each other by links. Therefore, this example has two sets of sub-templates; a set of sub-templates A, B, C and D and a set of sub-templates F, G and H.

Next, 0 is substituted into a variable i (step S2602). The variable i is a variable indicating which set of the sub-template sets set at step S2601 is currently being calculated. Then, the $i^{th}$ set of sub-templates is obtained (step S2603).

Then, the number of sub-templates in the sub-template set obtained at step S2603 is substituted into N (step S2604). As a set of sub-templates A, B, C and D has four sub-templates in FIG. 29A, for example, four is substituted into N. And, 0 is substituted into a variable j (step S2605). The variable j is a variable for indicating the ordinal position of the sub-template in the sequence of sub-templates set at step S2604 being calculated.

Figure 29B:
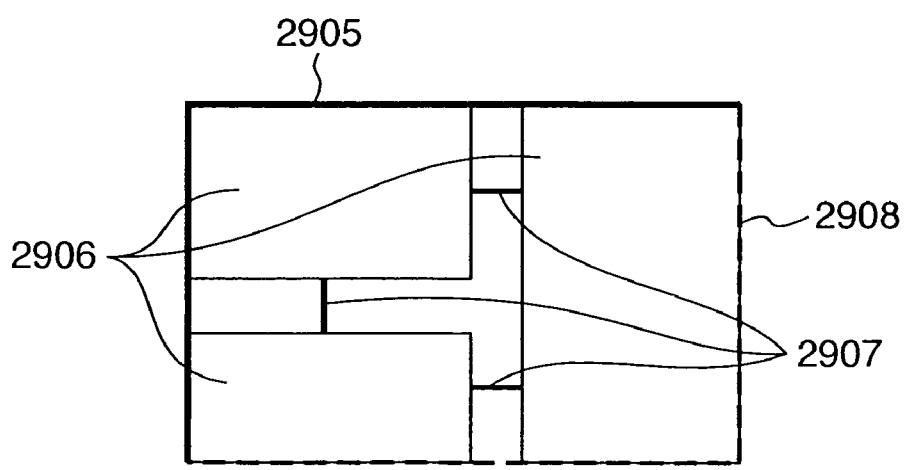

Then, $j^{th}$ sub-template is obtained (step S2606). And, the number of containers in the sub-templates obtained at step S2603 is substituted into M (step S2607). For example, the sub-template 2905 shown in FIG. 29B is enlarged view of a sub-template A shown in FIG. 29A. As three containers are laid out in this sub-template, three is substituted into M. In FIG. 29B, the reference number 2906 denotes containers laid out in a sub-template, 2907 denotes a link set between containers, and 2908 denotes variable edges of a sub container.

Next, 0 is substituted into a variable k (step S2608). The variable k is a variable for indicating the ordinal position of the container in the sequence of containers set at the abovementioned step being processed. The sizes of contents to be inserted in the $k^{th}$ container are obtained (step S2609). As an example of contents, an image or text is considered. Actual sizes of contents to be inserted in each container are obtained at this step.

Then, k is incremented (step S2610) and determination is made as to whether the sizes of contents have been obtained or not for all the containers in the sub-template (step S2611). The abovementioned processes in steps S2609-S2611 are repeated until the sizes of contents are obtained. When all the sizes of contents have been obtained, an ideal size for $j^{th}$ sub-template is calculated on the basis of the obtained sizes (step S2612).

Figure 30:
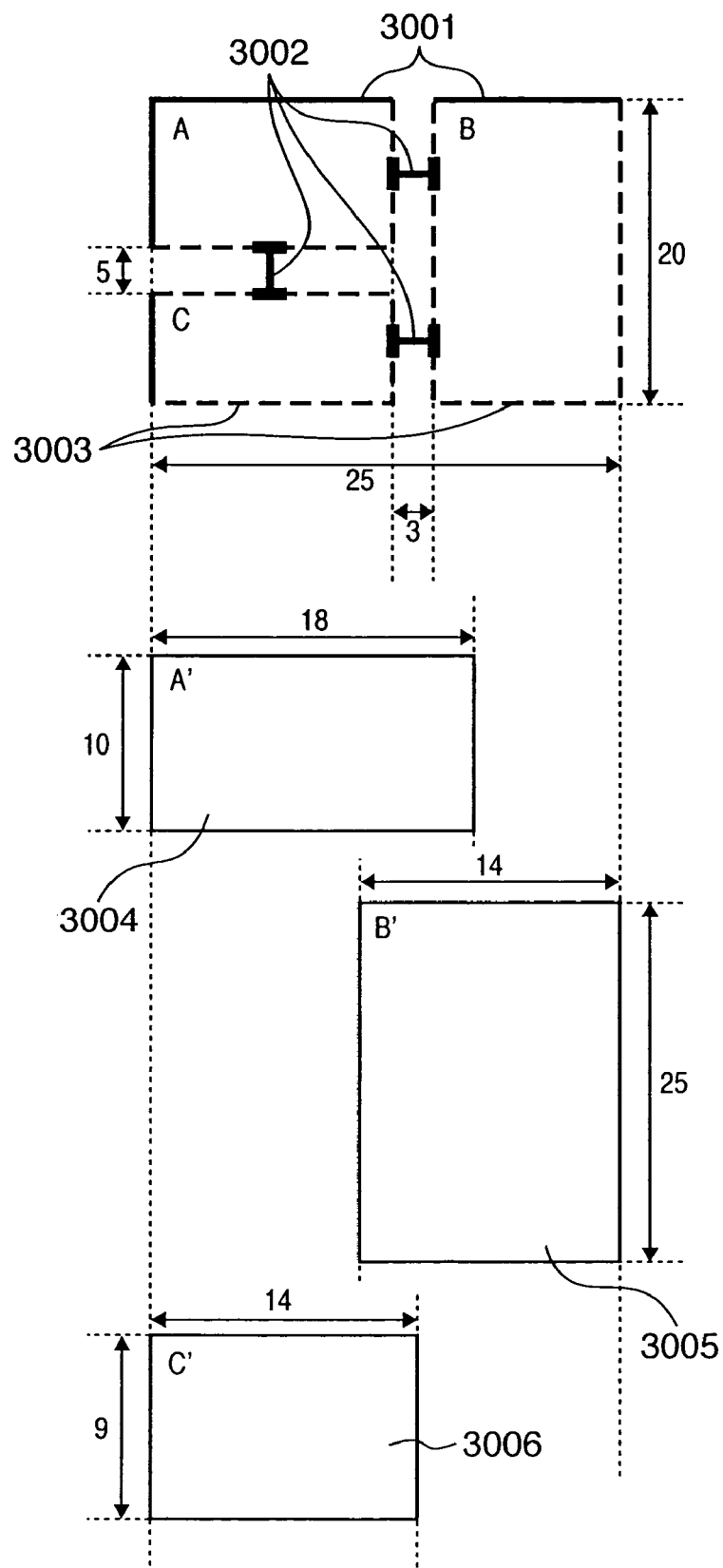
FIG. 30 is a diagram showing an example of layout calculation.

Exemplary calculation of an ideal size will be described with reference to FIG. 30. As shown in FIG. 30, sub-templates A, B and C are associated with each other by links 3002. The edges of the containers are set as a fixed edge 3001 or a variable edge 3003. The size in the horizontal and vertical directions of the whole contents is shown in the figure. The lengths of the links are set as shown in the figure.

In FIG. 30, contents A'3004 to be inserted in a container A have the size of 18 in the horizontal direction and 10 in the vertical direction. Contents B'3005 to be inserted in a container B have the size of 14 in the horizontal direction and 25 in the vertical direction. Contents C' 3006 to be inserted in a container C have the size of 14 in the horizontal direction and 9 in the vertical direction. An ideal size of the sub-template can be obtained from the sum of sizes of contents to be inserted in respective containers. The size in the horizontal direction is $$\text{Contents } A' + \text{link} + \text{contents } B' = 18 + 3 + 14 = 35 \quad (1)$$

$$\text{Contents } C' + \text{link} + \text{contents } B' = 14 + 3 + 14 = 31 \quad (2)$$

In the embodiment, when a plurality of systems exists in the same direction like this, the system with greater size is employed. In the above case, 35 in (1) is the ideal size in the horizontal direction of the sub-template.

Next, an ideal size in the vertical direction is obtained. The sum of sizes of contents in the vertical direction is $$\text{Contents } A' + \text{link} + \text{contents } C' = 10 + 5 + 9 = 24 \quad (3)$$

$$\text{Contents } B' = 25 \quad (4)$$

As the size in the vertical direction is determined in the same rule as the size in the horizontal direction, 25 in (4) is the ideal size in the vertical direction of the sub-template.

After an ideal size is calculated at step S2612 as mentioned above, j is incremented (step S2613). Then, determination is made as to whether ideal sizes for all the sub-templates have been calculated or not (step S2614). If the ideal sizes have not been calculated yet (No), the abovementioned processes in steps S2606-S2614 are repeated until all the ideal sizes have been calculated.

If it is determined that an ideal sizes for all the sub-templates have been calculated at step S2614 (Yes), layout calculation is performed for the $i^{th}$ set of sub-templates (step S2615). The layout calculation process at step S2615 will be described in detail later.

After layout calculation has been performed at step S2615, i is incremented (step S2616) and determination is performed as to whether the layout calculation has been performed for all the sub-template sets or not (step S2417). If it is determined that the calculation has not performed yet (No), the abovementioned processes in steps S2603-S2617 are repeated. If the calculation has been performed for all the sets (Yes), the layout calculation for the sub-templates laid out on the document finishes.

Figure 27:
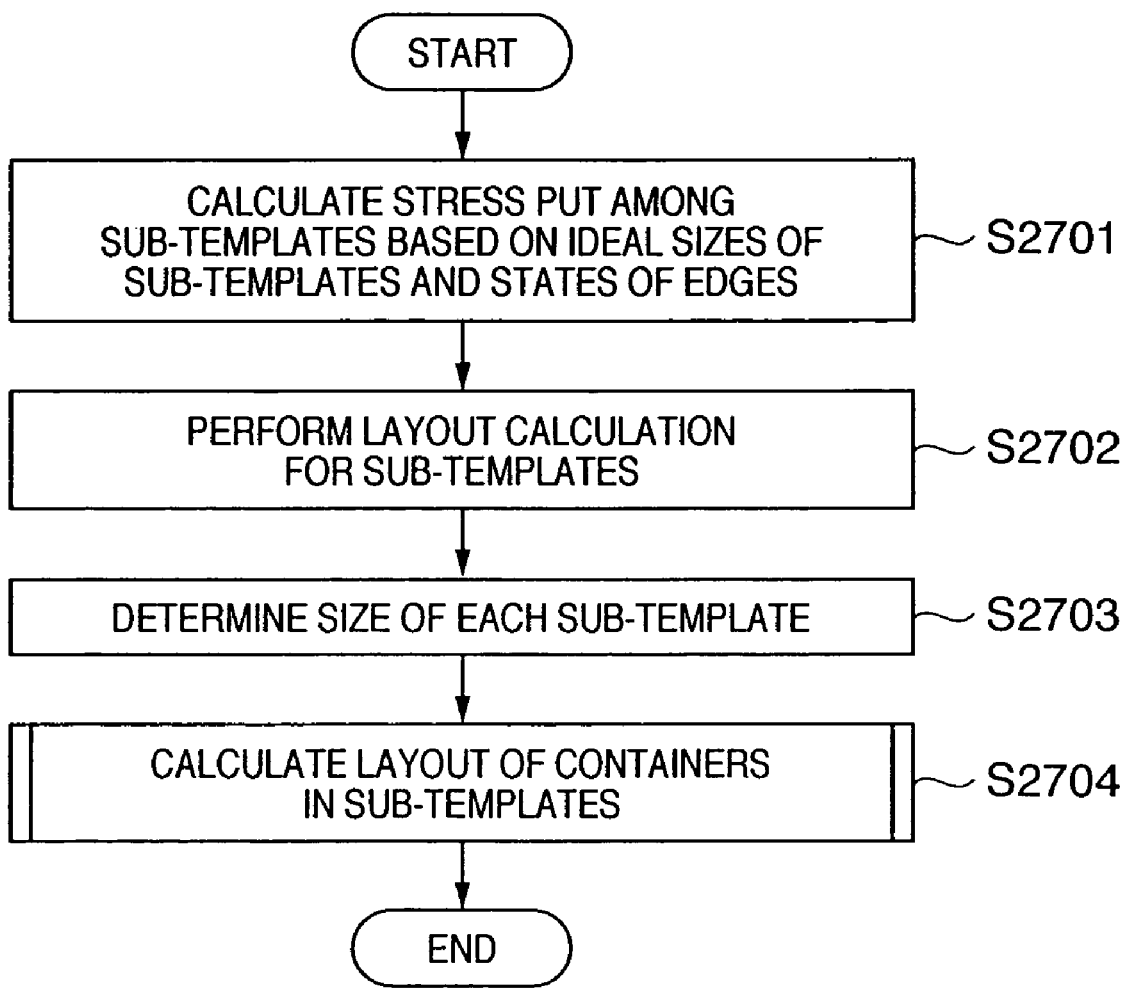
FIG. 27 is a flowchart for illustrating a layout calculating process (step S2615) in the flowchart shown in FIG. 26 in detail.

FIG. 27 is a flowchart for illustrating a layout calculating process (step S2615) in the flowchart shown in FIG. 26 in detail. First, a stress put among the sub-templates is calculated based on ideal sizes of the sub-templates and the states of edges (step S2701). The stress here refers to a load to be put among sub-templates. This will be described with reference to FIG. 31 as an example.

Figure 31:
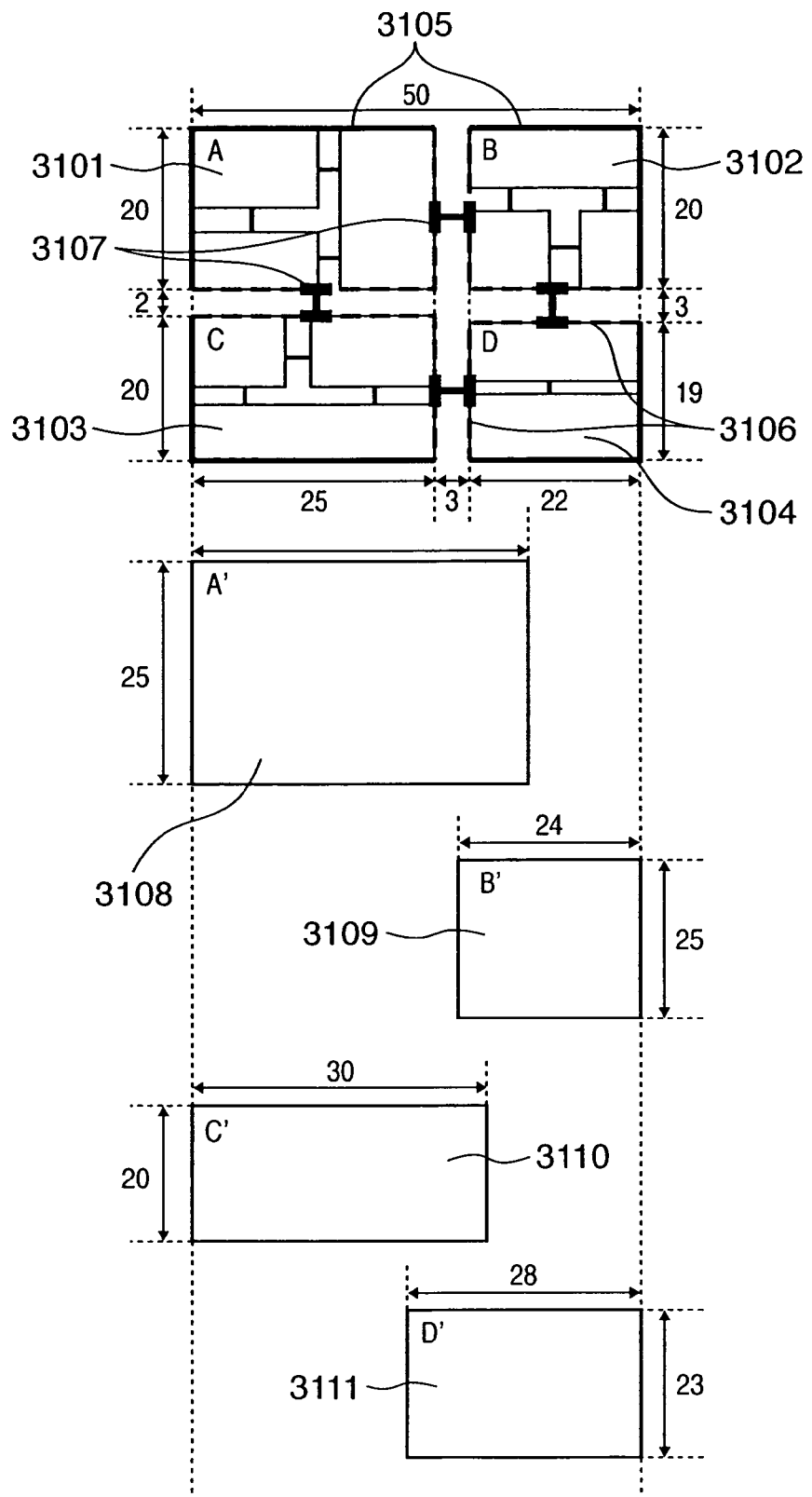
FIG. 31 is a diagram showing an example of layout calculation.

FIG. 31 shows a set of sub-templates. Sub templates A3101, B3102, C3103 and D3104 are associated with each other by links 3107. The reference number 3105 denotes fixed edges of the sub-templates and 3106 denotes variable edges of the sub-templates. Ideal sizes of respective sub-templates calculated by the abovementioned procedure based on the sizes of contents to be inserted in the containers in the sub-templates are shown as A' 3108-D'3111.

In FIG. 31, an ideal size A' of the sub-template A has a size of 35 in the horizontal direction and 30 in the vertical direction. An ideal size B' of the sub-template B has a size of 24 in the horizontal direction and 25 in the vertical direction. An ideal size C' of the sub-template C has a size of 30 in the horizontal direction and 20 in the vertical direction. An ideal size D' of the sub-template D has a size of 28 in the horizontal direction and 23 in the vertical direction.

In the horizontal direction, stresses put in this layout are different among sub-templates A and B, and sub-templates C and D. An ideal size between sub-templates A and B is $$\text{Ideal size } A' + \text{link} + \text{ideal size } B' = 3 + 3 + 24 = 62 \quad (1)$$

An ideal size between C and D is $$\text{Ideal size } C' + \text{link} + \text{ideal size } D' = 30 + 3 + 28 = 61 \quad (2)$$

The size of a set of sub-templates show in FIG. 31 in the horizontal direction is $$25 + 3 + 22 = 50 \quad (3),$$

thus the stress between A and B is calculated as $$62 - 50 = 12 \quad (4)$$

and the stress between C and D is calculated as $$61 - 50 = 11 \quad (5).$$

The sizes are calculated in the same manner for the vertical direction and the stress between the sub-templates A and C is calculated as 5 and the stress between the sub-templates B and D is calculated as 9. With thus obtained stresses, layout calculation is performed for the sub-templates (step S2702). Then, the layout of the sub-templates obtained by the calculation is determined (step S2703). The calculated layout of the sub-template is shown in FIG. 32.

Figure 32:
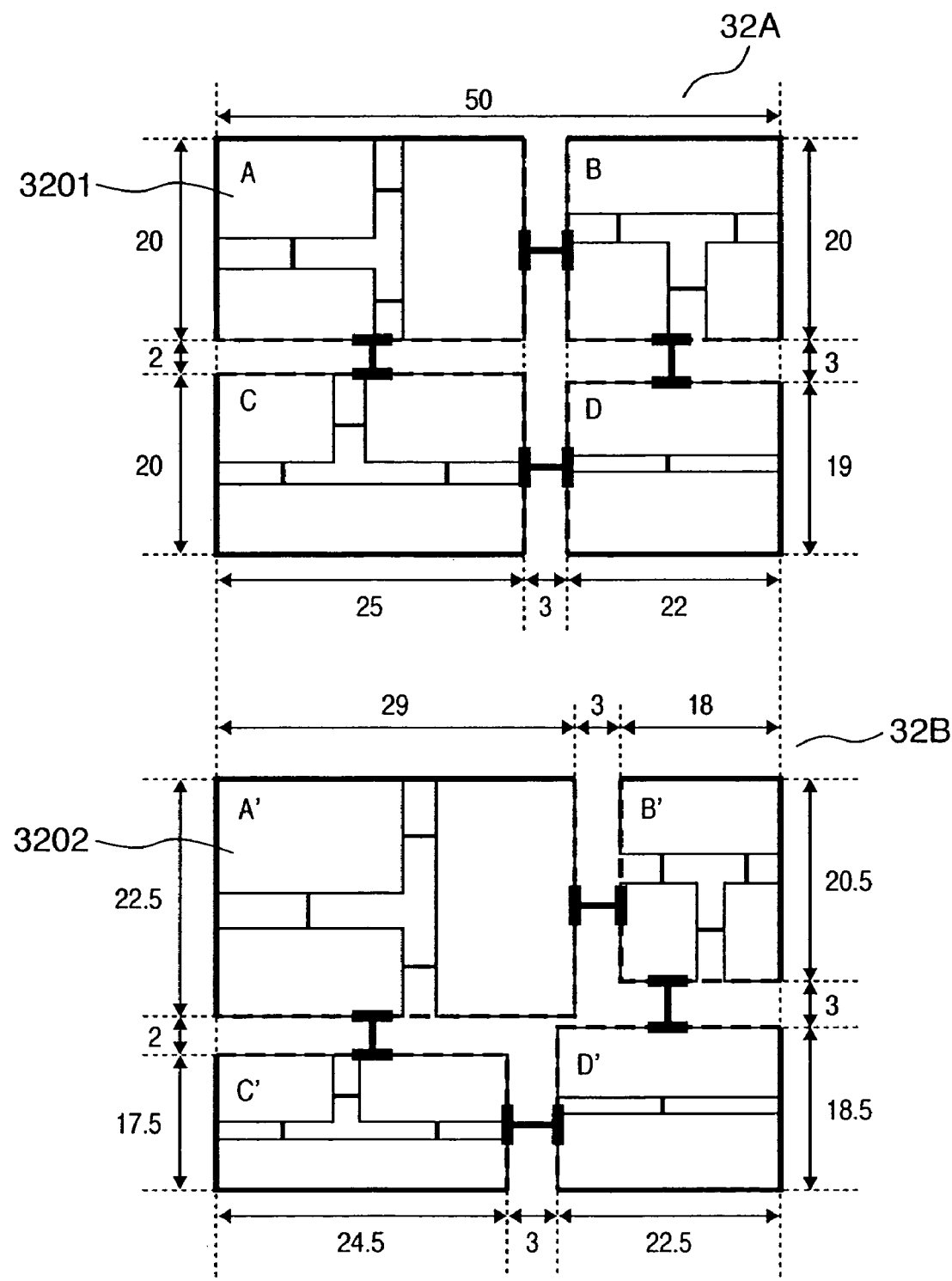
FIG. 32 is a diagram showing an example of layout calculation.

In FIG. 32, a set of sub-templates 32A is the same as that shown in FIG. 31. A set of templates 32B indicates a layout calculated from the ideal sizes which are obtained for the sub-templates in FIG. 31. As shown in FIG. 32, the layout size is determined by the sub-templates negotiating each other.

Figure 28:
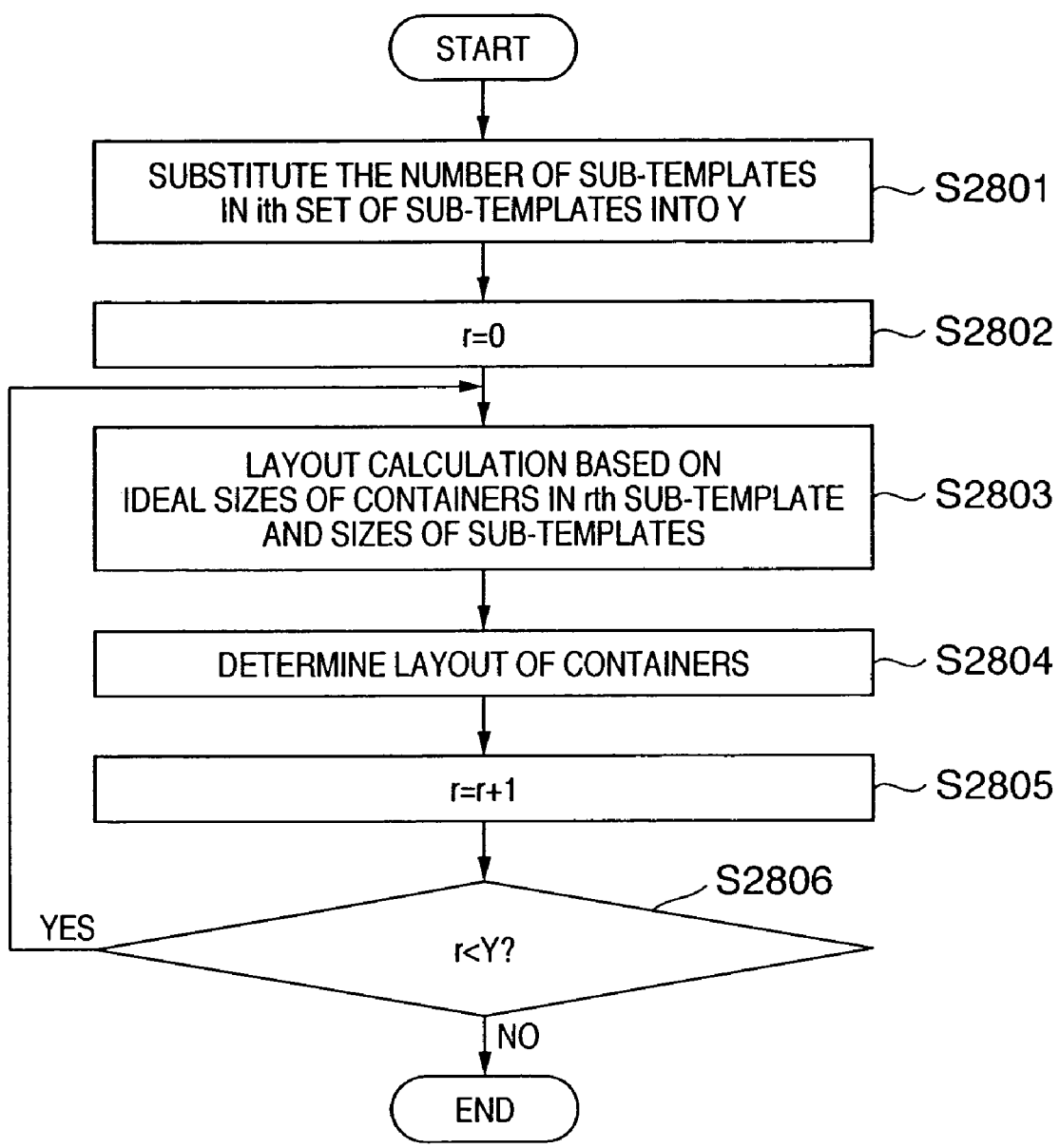
FIG. 28 is a flowchart for illustrating a process of calculating a container size in a sub-template (step S2704) in the flowchart shown in FIG. 27 in detail.

After the layout size for the sub-templates is determined as mentioned above, the container sizes in the sub-templates are determined (step S2704). FIG. 28 is a flowchart for illustrating a process of calculating a container size in a sub-template (step S2704) in the flowchart shown in FIG. 27 in detail.

First, the number of sub-templates in the $i^{th}$ set of sub-templates is substituted into Y (step S2801). Next, 0 is substituted into a variable r (step S2802). Then, the layout of the containers is calculated based on ideal sizes of containers in the $r^{th}$ sub-template and sizes of sub-templates (step S2803).

Figure 33:
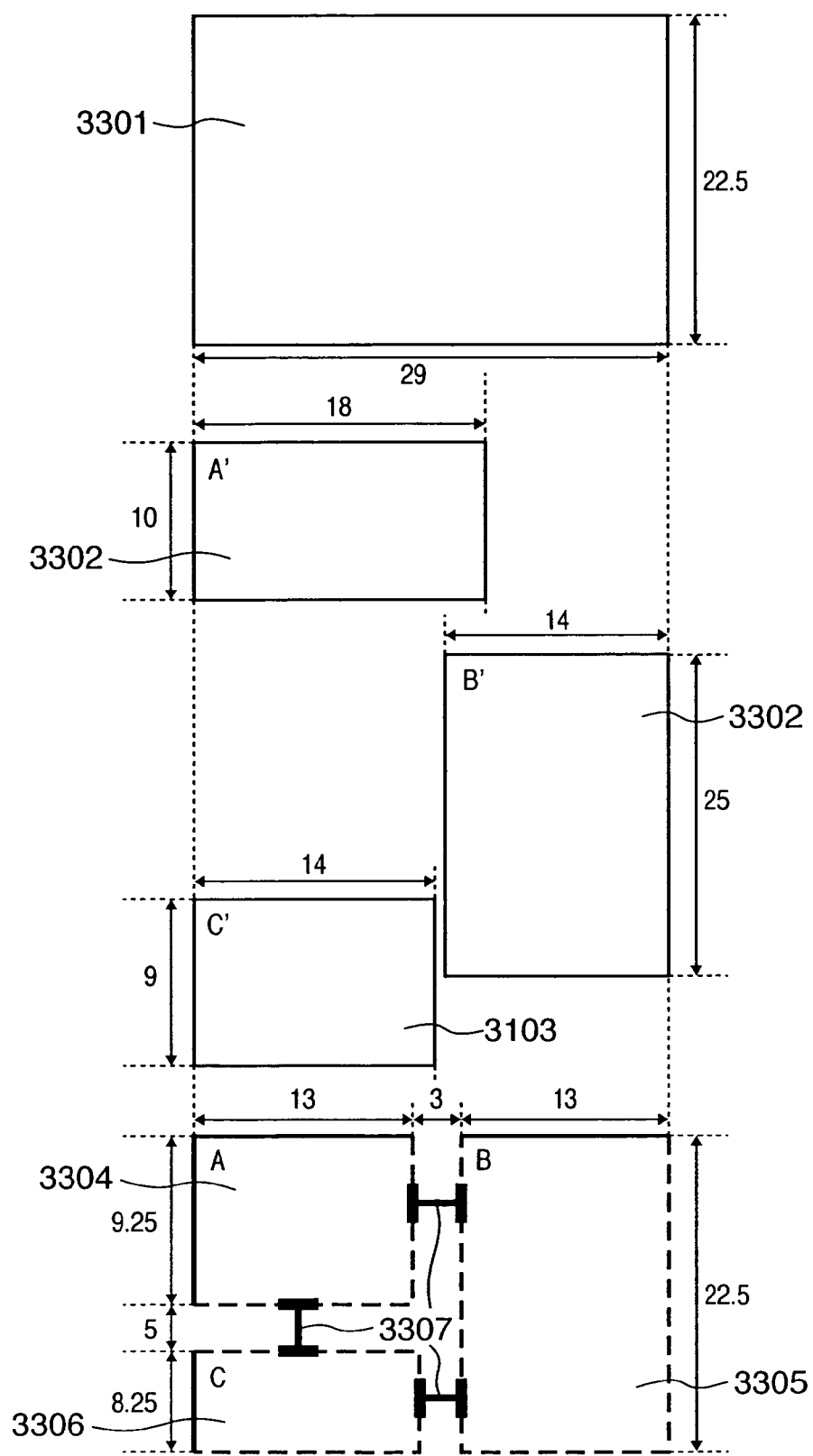
FIG. 33 is a diagram showing layout calculation of a container in a sub-template.

FIG. 33 is a diagram showing the layout calculation of a container in a sub-template. In FIG. 33, the reference number 3301 denotes a size of the sub-template determined at the abovementioned step and 3302-3304 denote ideal sizes of contents A'-C' to be inserted in containers A-C in the sub-template. The layout of the containers is calculated based on the size of the sub-template and the ideal sizes of the containers. The calculated layout is shown as containers A-C (3304-3306). The layout is calculated with the containers negotiating each other by links 3307.

After layout calculation for containers has been performed, the layout of the containers is determined (S2804). Then, r is incremented (step S2805) and determination is made as to whether calculation has been performed for all the sub-templates or not (step S2806). If the calculation has not been performed for all the sub-templates (No), the abovementioned steps S2803-S2806 are repeated. If the layout of the containers has been determined for all the sub-templates (Yes), the process ends.

In the embodiment, priority setting for a layout is not described in particular for containers. For example, as an automatic layout system has a technology for setting priority for a layout, it is matter of course that a layout considering the priority is possible when a priority is set. It is also possible to set priority for a sub-template which does not define a container but a layout of a plurality of containers. A size can be calculated with considering a priority set in calculating the sub-template sizes in the abovementioned layout calculation for sub-templates.

The calculation is the same as that performed when priority is set for the containers.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, a size or a layout of a sub-template can be preferably set according to the sizes of contents to be affixed in the sub-template so that an intention of a user who performs the layout is better reflected.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-252901 filed on Aug. 31, 2004, the entire contents of which are hereby incorporated by reference herein.

What is claimed is:

1. A layout adjustment method for determining a layout of a page, comprising:
a first setting step of setting a first link to link small partial areas to each other, each of the small partial areas inserting data, and each of the small partial areas contained in a first big partial area laid out in the page;
a second setting step of setting second links to link big partial areas, including the first big partial area, to each other, each of the big partial areas laid out in the page;
a first deciding step of deciding a size of the first big partial area based on the first link and the amount of data which is inserted to each of the small partial areas contained in the big partial area;
a changing step of changing a size of the first big partial area decided in the first deciding step so that a sum of a length of the horizontal direction of the big partial areas laid out in the horizontal direction and a length of the second link that links the big partial areas laid out in the horizontal direction is shorter than a length of the page in the horizontal direction, and a sum of a length of the vertical direction of the big partial areas laid out in the vertical direction and a length of the second link that links the big partial areas laid out in the vertical direction is shorter than a length of the page in the vertical direction;
a second deciding step of deciding a size of one of the small partial areas based on the amount of data which is inserted to each of the small partial areas in the first big partial area and the first link so that the small partial areas are laid out within the first big partial area changed in the changing step; and
a displaying step of displaying the page on a display, on which the big partial area that includes the small partial areas is laid out.

2. The layout adjustment method according to claim 1, wherein the second deciding step decides a size of each of the small partial areas in the first big partial area so that a sum of a length of the horizontal direction of the small partial areas laid out in the horizontal direction and a length of the first link that links the small partial areas laid out in the horizontal direction is shorter than a length of the horizontal direction of the first big partial area, and a sum of a length of the vertical direction of the small partial areas laid out in the vertical direction and a length of the first link that links the small partial areas laid out in the vertical direction is shorter than a length of the vertical direction of the first big partial area.

3. The layout adjustment method according to claim 1, further comprising:
a third setting step of setting states of edges of the first big partial area,
wherein the third setting step sets the states of edge edges of the first big partial area as variable when all the states of edges of the small partial areas touching edges of the first big partial area are variable, and sets the states of edges of the first big partial area as fixed when the states of at least one of edges of the small partial areas touching edges of the first big partial area is fixed.

4. The layout adjustment method according to claim 1, wherein the first setting step selectively sets the first link between a link with a flexible length and a link with a fixed length.

5. A layout adjustment apparatus for determining a layout of a page, comprising:
a processor;
first setting means configured to set a first link to link small partial areas to each other, each of the small partial areas inserting data, and each of the small partial areas contained in a first big partial area laid out in the page;

second setting means configured to set second links to link big partial areas, including the first big partial area, to each other, each of the big partial areas laid out in the page;

first deciding means configured to decide a size of the first big partial area based on the first link and the amount of data which is inserted to each of the small partial areas contained in the first big partial area;

changing means configured to change a size of the big partial area decided by the first deciding means so that a sum of a length of the horizontal direction of the big partial areas laid out in the horizontal direction and a length of the second link that links the big partial areas laid out in the horizontal direction is shorter than a length of the page in the horizontal direction, and a sum of a length of the vertical direction of the big partial areas laid out in the vertical direction and a length of the second link that links the big partial areas laid out in the vertical direction is shorter than a length of the page in the vertical direction;

second deciding means configured to decide a size of one of the small partial areas based on the amount of data which is inserted to each of the small partial areas in the first big partial area and the first link so that the small partial areas are laid out within the first big partial area changed in the changing means, and display means for displaying the page on which the first big partial area that includes the small partial areas is laid out.

6. The layout adjustment apparatus according to claim 5, wherein the second deciding means decides a size of each of the small partial areas in the first big partial area so that a sum of a length of the horizontal direction of the small partial areas laid out in the horizontal direction and a length of the first link that links the small partial areas laid out in the horizontal direction is shorter than a length of the horizontal direction of the first big partial area.

7. The layout adjustment apparatus according to claim 5, further comprising:

third setting means configured to set states of edges of the first big partial area;

wherein the third setting means sets the states of edges of the first big partial area as variable when all the states of edges of the small partial areas touching edges of the first big partial area are variable, and sets the states of edges of the first big partial area as fixed when the states of at least one of edges of the small partial areas touching edges of the first big partial area is fixed.

8. The layout adjustment apparatus according to claim 5, wherein the first setting means selectively sets the first link between a link with a flexible length and a link with a fixed length.

9. A computer-readable storage device storing a program that is executed by a computer, the program causing the computer to:

set a first link to link small partial areas to each other, each of the small partial areas inserting data, and each of the small partial areas contained in a first big partial area laid out in a page and set second links to link big partial areas, including the first big partial area, to each other, each of which is laid out in the page;

decide a size of the first big partial area based on the first link and the amount of data which is inserted to each of the small partial areas contained in the first big partial area;

change a size of the decided first big partial area so that a sum of a length of the horizontal direction of the big partial areas laid out in the horizontal direction and a length of the second link that links the big partial areas laid out in the horizontal direction is shorter than a length of the page in the horizontal direction, and a sum of a length of the vertical direction of the big partial areas laid out in the vertical direction and a length of the second link that links the big partial areas laid out in the vertical direction is shorter than a length of the page in the vertical direction;

decide a size of one of the small partial areas based on the amount of data which is inserted to each of the small partial areas in the first big partial area and the first link so that the small partial areas are laid out within the changed first big partial area; and display the page on which the first big partial area that includes the small partial areas is laid out.

10. The computer-readable storage device according to claim 9, wherein a size of each of the small partial areas in the first big partial area is decided so that a sum of a length of the horizontal direction of the small partial areas laid out in the horizontal direction and a length of the first link that links the small partial areas laid out in the horizontal direction is shorter than a length of the horizontal direction of the first big partial area, and a sum of a length of the vertical direction of the small partial areas laid out in the vertical direction and a length of the first link that links the small partial areas laid out in the vertical direction is shorter than a length of the vertical direction of the first big partial area.

11. The medium computer-readable storage device according to claim 9, wherein the program farther causes the computer to:

set states of edges of the first big partial area, wherein the states of edges of the first big partial area are set as variable when all the states of edges of the small partial areas touching edges of the first big partial area are variable, and the states of edges of the first big partial area as fixed when the states of at least one of edges of the small partial areas touching edges of the first big partial area is fixed.

12. The computer-readable storage device according to claim 9, wherein the first link is selectively set between a link with a flexible length and a link with a fixed length.

* * * * *